US010030142B2

(12) United States Patent
Beuhler et al.

(10) Patent No.: US 10,030,142 B2
(45) Date of Patent: Jul. 24, 2018

(54) POLYESTER POLYOLS AND METHODS OF MAKING AND USING THE SAME

(71) Applicant: Elevance Renewable Sciences, Inc., Woodridge, IL (US)

(72) Inventors: Allyson Beuhler, Woodridge, IL (US); Debra Tindall, Pendleton, SC (US); Kamlesh Mody, Woodridge, IL (US); Donald A. Meltzer, Akron, OH (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 0 days.

(21) Appl. No.: 15/190,914

(22) Filed: Jun. 23, 2016

(65) Prior Publication Data

US 2017/0066921 A1  Mar. 9, 2017

Related U.S. Application Data

(63) Continuation of application No. 14/508,643, filed on Oct. 7, 2014, now Pat. No. 9,403,937.

(60) Provisional application No. 61/894,292, filed on Oct. 22, 2013, provisional application No. 61/969,469, filed on Mar. 24, 2014, provisional application No. 62/004,793, filed on May 29, 2014, provisional application No. 62/013,910, filed on Jun. 18, 2014, provisional application No. 62/048,659, filed on Sep. 10, 2014.

(51) Int. Cl.
*C08L 75/06* (2006.01)
*C08G 63/16* (2006.01)
*C08G 81/00* (2006.01)
*C08G 18/42* (2006.01)
*C08L 101/00* (2006.01)
*C08G 18/66* (2006.01)
*C08G 18/76* (2006.01)
*C08G 18/32* (2006.01)

(52) U.S. Cl.
CPC .......... *C08L 75/06* (2013.01); *C08G 18/3206* (2013.01); *C08G 18/42* (2013.01); *C08G 18/4238* (2013.01); *C08G 18/4263* (2013.01); *C08G 18/664* (2013.01); *C08G 18/7671* (2013.01); *C08G 63/16* (2013.01); *C08G 81/00* (2013.01); *C08L 101/00* (2013.01); *C08G 2280/00* (2013.01)

(58) Field of Classification Search
CPC .... C08G 63/16; C08G 18/42; C08G 18/3206; C08G 18/4238; C08G 18/4263; C08G 18/664; C08G 81/00; C08G 2280/00; C08L 75/06; C08L 101/00
See application file for complete search history.

(56) References Cited

U.S. PATENT DOCUMENTS

| 4,507,430 | A | 3/1985 | Shimada et al. |
| 4,808,255 | A | 2/1989 | Markevka et al. |
| 4,985,535 | A | 1/1991 | Takada et al. |
| 5,019,638 | A | 5/1991 | Muller et al. |
| 5,508,371 | A | 4/1996 | Werenicz et al. |
| 5,672,653 | A | 9/1997 | Frisch et al. |
| 7,022,804 | B2 | 4/2006 | Miscovic et al. |
| 2002/0040071 | A1 | 4/2002 | Lin et al. |
| 2003/0022965 | A1 | 1/2003 | Bindschedler et al. |
| 2003/0144454 | A1 | 7/2003 | Krebs et al. |
| 2005/0288478 | A1 | 12/2005 | Burgo |
| 2006/0025555 | A1 | 2/2006 | Ichihashi et al. |
| 2007/0213465 | A1 | 9/2007 | Brand et al. |
| 2009/0192262 | A1 | 7/2009 | Meltzer et al. |
| 2009/0197984 | A1 | 8/2009 | Bartelink et al. |
| 2010/0056682 | A1 | 3/2010 | Meltzer et al. |
| 2010/0126664 | A1 | 3/2010 | O'Brien |
| 2012/0160413 | A1* | 6/2012 | Laferte ................. C08G 18/10 156/331.7 |
| 2012/0258269 | A1 | 10/2012 | Gehringer et al. |

FOREIGN PATENT DOCUMENTS

| WO | 2013/057439 | 4/2013 |
| WO | 2015/097433 | 7/2015 |

OTHER PUBLICATIONS

PCT International Search Report, PCT App. No. PCT/US2014/059470, dated Feb. 3, 2015.
Jiang et al., J. Nanomaterials, vol. 2006, pp. 1-10 (2006).
Athwale et al., Eu. Coatings J., vol. 45, pp. 1-7 (2002).
Novak et al., "Novel C12 Chain Extenders for Polyurethanes" API Conference Presentation (2008).
"Novel Polybutadiene Diols for Thermoplastic Polyurethanes" Total Applications Bulletin (2010).
Theunissen et al., "Evaluating the Properties and Performance of Biosuccinium Sustainable Succinic Acid Based Copolyester Polyols in TPU Applications" (2013).
Paz et al., "Polyurethanes Based on Fatty Acids with Improved Biocompatibility" Thesis, Universitat Rovira I Vergili (2012).
Hojabri et al., J. Polymer Science, Part A: Polymer Chemistry, vol. 48, pp. 3302-3310 (2010).
Hojabri et al., Biomacromolecules, vol. 11, pp. 911-918 (2010).
Friebel et al., in "Von Einander Lemen: Innovationen in Bauchemie und Lackchemie" (Schubert, K., ed.) pp. 215-222 (2008).

* cited by examiner

*Primary Examiner* — Robert Jones, Jr.
(74) *Attorney, Agent, or Firm* — Kilpatrick Townsend & Stockton LLP

(57) ABSTRACT

Polyester polyols are generally disclosed, including methods of making and using them. In some embodiments, the polyester polyols are incorporated into a block copolymer, such as a polyurethane block copolymer. In some embodiments, the polyurethane block copolymers can be used as compatibilizing agents, which can be used, for example, in polymer blends, polymer alloys, solutions, emulsions, as well as in extruded and injection molded articles. In some embodiments, at least a portion of the polyurethane block copolymer is derived from a renewable source.

20 Claims, 7 Drawing Sheets

POLYESTER POLYOLS AND METHODS OF MAKING AND USING THE SAME

CROSS-REFERENCE TO RELATED APPLICATIONS

The present application is a continuation of U.S. patent application Ser. No. 14/508,643, filed Oct. 7, 2014, which claims the benefit of priority of the following applications: U.S. Provisional Application No. 61/894,292, filed Oct. 22, 2013; U.S. Provisional Application No. 61/969,469, filed Mar. 24, 2014; U.S. Provisional Application No. 62/004,793, filed May 29, 2014; U.S. Provisional Application No. 62/013,910, filed Jun. 18, 2014; and U.S. Provisional Application No. 62/048,659, filed Sep. 10, 2014. The foregoing applications are all hereby incorporated by reference as though fully set forth herein in their entirety.

TECHNICAL FIELD

Polyester polyols are generally disclosed, including methods of making and using them. In some embodiments, the polyester polyols are incorporated into a block copolymer, such as a polyurethane block copolymer. In some embodiments, the polyurethane block copolymers can be used as compatibilizing agents, which can be used, for example, in polymer blends, polymer alloys, solutions, emulsions, as well as in extruded and injection molded articles. In some embodiments, at least a portion of the polyurethane block copolymer is derived from a renewable source.

BACKGROUND

Natural oils provide chemical species that differ in structure from those generally obtained from traditional petroleum refining processes. In many instances, natural oils contain multifunctional moieties that contain, among other features, an ester or acid group and an olefinic group. When natural oils are refined, the products obtained from the refining process can yield unique compounds that can serve as useful building blocks for various chemical species.

Polyurethanes are a class of polymers having chains of organic units joined by carbamate linkages, but which can include other linkages as well. In many instances, polyurethanes exist as block copolymers, where one block is formed from a prepolymer that contains carbamate linkages (e.g., a polycarbamate prepolymer) and another block is formed from another polymer, such as a polyester. Polyurethanes can have a wide variety of physical properties, which depend, among other factors, on the combination and arrangement of monomers and blocks used to make the polyurethane. In some instances, certain blocks are hard or rigid (e.g., the polycarbamate portion) while others are soft and flexible (e.g., the polyester portion). Alteration of the chemical structure, size and/or frequency of these blocks in a polyurethane can allow for modification of the properties of the resin. These options can lead to resins having a wide array of different properties. Some of these resins can be thermosetting, while others can be thermoplastic. Because such resins contain multiple blocks having different chemical features, they can also be useful as compatibilizers, e.g., in a blend.

Polyurethane foams can be used for a number of different applications. Polyurethane foams may be flexible or rigid, and can be used in a variety of different applications, including, but not limited to, use for foam insulation, use in packaging materials, and use in cushioning. Polyurethanes can also be used as elastomers. Polyurethane elastomers can be solid or porous, with representative applications including, but not limited to, textile fibers, coatings, sealants, adhesives, and resilient pads. Polyurethanes can also be used as thermosetting polymers. Representative applications of polyurethane thermosets include, but are not limited to, abrasion resistant wheels, mechanical parts, and structural materials.

It is desirable to expand the chemical structures present in polyurethanes, so as to expand the useful properties that can be provided by the polymers. For example, properties such as flexibility, toughness, etc. can be improved by incorporating chemical groups that lower the modulus or that can absorb energy, respectively. One may also be able to improve the effectiveness of the polyurethane as a compatibilizer by incorporating new chemical groups into one or more of the blocks. This expansion of chemical structures may be accomplished through post-polymerization processing, such as reaction with other reagents or blending with other polymers. It may be desirable, however, to expand the chemical structures by introducing new chemical structures in the monomeric building blocks from which the polyurethane resin is formed.

Thus, there is a continuing need to develop new materials that can be incorporated into polymeric materials, such as polyurethanes, so as to develop resins having new and useful properties. Consistent with that, there is a continuing need to expand the range of available polyester polyols that, among other available uses, can be incorporated into polyurethanes and thereby obtain resins having properties, such as compatibilizing properties, that would not otherwise be possible.

SUMMARY

In a first aspect, the disclosure provides polyester polyols that include, among other features, one or more constitutional units according to formula (I):

(I)

wherein $X^1$ is $C_{8-36}$ alkylene, $C_{8-36}$ alkenylene, $C_{8-36}$ heteroalkylene, or $C_{8-36}$ heteroalkenylene, each of which is optionally substituted one or more times by substituents selected independently from $R^1$; and $R^1$ is a halogen atom, —OH, —NH$_2$, $C_{1-6}$ alkyl, $C_{1-6}$ heteroalkyl, $C_{2-6}$ alkenyl, $C_{2-6}$ heteroalkenyl, $C_{3-10}$ cycloalkyl, or $C_{2-10}$ heterocycloalkyl.

In a second aspect, the disclosure provides polyester polyols, which are formed from a reaction mixture comprising: a first short-chain diol; and a diacid or an ester thereof. In some embodiments, the diacid or ester thereof, is a $C_{11-24}$ aliphatic straight-chain diacid, or an ester thereof. In some other embodiments, the diacid or ester thereof, is a $C_{14-24}$ aliphatic straight-chain diacid, or an ester thereof.

In a third aspect, the disclosure provides a block copolymer having two or more different blocks, including a first block and a second block, where the first block is a polycarbamate block that can be formed from a diisocyanate prepolymer, and the second block is a polyester block that is formed from a polyester polyol of the first or second aspects, or any embodiments thereof.

In a fourth aspect, the disclosure provides a polymer composition including a polymer, such as a non-polar polymer, and a block copolymer of the third aspect, or any embodiments thereof. In some embodiments, the polymer composition is a blend or alloy. In some such embodiments, the blend or alloy has one or more solid or semi-solid surfaces, which are paintable. In some other embodiments, the polymer composition is a solution or an emulsion. In some other embodiments, the polymer composition is a multi-layered (e.g., bilayered) structure, where one layer includes the polymer and the other layer includes the block copolymer. In some embodiments, the polymer composition is an extruded or an injection molded article.

In a fifth aspect, the disclosure provides a polymer composition including two or more different polymers (e.g., having a difference in polarity) and a block copolymer of the third aspect, or any embodiments thereof. In some embodiments, the polymer composition is a blend or alloy. In some such embodiments, the blend or alloy has one or more solid or semi-solid surfaces, which are paintable. In some other embodiments, the polymer composition is a solution or an emulsion. In some other embodiments, the polymer composition is a multi-layered (e.g., bilayered) structure, where one layer includes the polymer and the other layer includes the block copolymer. In some embodiments, the polymer composition is an extruded or an injection molded article. In some embodiments, the two or more polymers are not readily miscible, and the block copolymer acts to reduce the degree of phase separation in the polymer composition.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
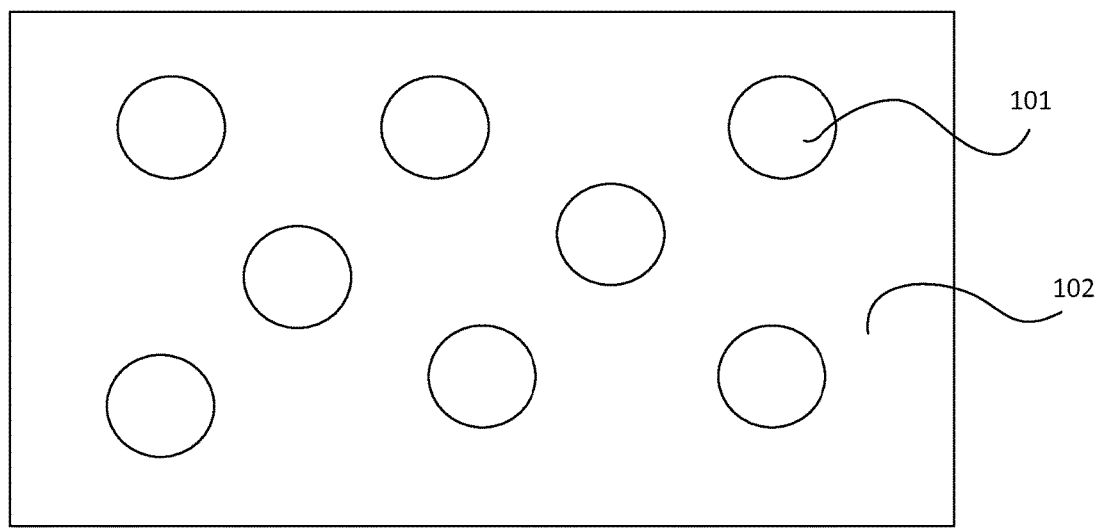
FIG. 1 depicts a polymer composition that includes a blend or alloy of two polymers, where one of the polymers is a block copolymer according to certain embodiments disclosed herein.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks.

As used herein, "monomer" refers to a substance that can undergo a polymerization reaction to contribute constitutional units to the chemical structure of a polymer.

As used herein, "prepolymer" refers to a polymer that can undergo further reaction to contribute constitutional units to the chemical structure of a different polymer.

As used herein, "polymer sequence" refers generically to any species formed from a reaction of monomers. In some instances, a "polymer sequence" can refer to an entire polymer molecule or copolymer molecule, such as, for example, with a homopolymer or an alternating copolymer.

In other instances, a "polymer sequence" can refer to a portion of a polymer molecule, such as a block within a block copolymer.

As used herein, "copolymer" refers to a polymer having constitutional units formed from more than one species of monomer.

As used herein, "block copolymer" refers to a copolymer having two or more different blocks of polymerized monomers, i.e., different polymer sequences.

As used herein, "polyurethane" refers to a polymer comprising two or more urethane (or carbamate) linkages. Other types of linkages can be included, however. For example, in some instances, the polyurethane or polycarbamate can contain urea linkages, formed, for example, when two isocyanate groups can react. In some other instances, a urea or urethane group can further react to form further groups, including, but not limited to, an allophanate group, a biuret group, or a cyclic isocyanurate group. In some embodiments, at least 70%, or at least 80%, or at least 90%, or at least 95% of the linkages in the polyurethane or polycarbamate are urethane linkages. Further, in the context of a block copolymer, the term "polyurethane block copolymer" refers to a block copolymer, where one or more of the blocks are a polyurethane or a polycarbamate. Other blocks in the "polyurethane block copolymer" may contain few, if any, urethane linkages. For example, in some polyurethane block copolymers, at least one of the blocks is a polyether or a polyester and one or more other blocks are polyurethanes or polycarbamates.

As used herein, "polyester" refers to a polymer comprising two or more ester linkages. Other types of linkages can be included, however. In some embodiments, at least 80%, or at least 90%, or at least 95% of the linkages in the polyester are ester linkages. The term can refer to an entire polymer molecule, or can also refer to a particular polymer sequence, such as a block within a block copolymer.

As used herein, "polyether" refers to a polymer comprising two or more ether linkages. Other types of linkages can be included, however. In some embodiments, at least 80%, or at least 90%, or at least 95% of the linkages in the polyether are ether linkages. The term can refer to an entire polymer molecule, or can also refer to a particular polymer sequence, such as a block within a block copolymer.

As used herein, "reaction" and "chemical reaction" refer to the conversion of a substance into a product, irrespective of reagents or mechanisms involved.

As used herein, "reaction product" refers to a substance produced from a chemical reaction of one or more reactant substances.

The term "group" refers to a linked collection of atoms or a single atom within a molecular entity, where a molecular entity is any constitutionally or isotopically distinct atom, molecule, ion, ion pair, radical, radical ion, complex, conformer etc., identifiable as a separately distinguishable entity. The description of a group as being "formed by" a particular chemical transformation does not imply that this chemical transformation is involved in making the molecular entity that includes the group.

The term "functional group" refers to a group that includes one or a plurality of atoms other than hydrogen and $sp^3$ carbon atoms. Examples of functional groups include but are not limited to hydroxyl, protected hydroxyl, ether, ketone, ester, carboxylic acid, cyano, amido, isocyanate, urethane, urea, protected amino, thiol, sulfone, sulfoxide, phosphine, phosphite, phosphate, halide, and the like.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "metathesis catalyst" includes any catalyst or catalyst system that catalyzes an olefin metathesis reaction.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9, 12-octadecadienoic acid), and linolenic acid (9,12,15-octadecatrienoic acid).

As used herein, "metathesize" or "metathesizing" refer to the reacting of a feedstock in the presence of a metathesis catalyst to form a "metathesized product" comprising new olefinic compounds, i.e., "metathesized" compounds.

Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

The term "metathesized natural oil" refers to the metathesis reaction product of a natural oil in the presence of a metathesis catalyst, where the metathesis product includes a new olefinic compound. A metathesized natural oil may include a reaction product of two triglycerides in a natural feedstock (self-metathesis) in the presence of a metathesis catalyst, where each triglyceride has an unsaturated carbon-carbon double bond, and where the reaction product includes a "natural oil oligomer" having a new mixture of olefins and esters that may include one or more of metathesis monomers, metathesis dimers, metathesis trimers, metathesis tetramers, metathesis pentamers, and higher order metathesis oligomers (e.g., metathesis hexamers). A metathesized natural oil may include a reaction product of a natural oil that includes more than one source of natural oil (e.g., a mixture of soybean oil and palm oil). A metathesized natural oil may include a reaction product of a natural oil that includes a mixture of natural oils and natural oil derivatives.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths.

As used herein, "alcohol" or "alcohols" refer to compounds having the general formula: R—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "alcohol" or "alcohols" may refer to a group of compounds with the general formula described above, wherein the compounds have different carbon lengths. The term "hydroxyl" refers to a —OH moiety. In some cases, an alcohol can have more than two or more hydroxyl groups. As used herein, "diol" and "polyol" refer to alcohols having two or more hydroxyl groups. A "polyester polyol" is a polyester polymer or prepolymer having two or more hydroxyl groups.

As used herein, "amine" or "amines" refer to compounds having the general formula: R—N(R')(R"), wherein R, R', and R" denote a hydrogen or an organic moiety (such as alkyl, aryl, or silyl groups), including those bearing heteroatom-containing substituent groups. In certain embodiments, R, R', and R" denote a hydrogen or an alkyl, alkenyl, aryl, or alcohol groups. In certain embodiments, the term "amines" may refer to a group of compounds with the general formula described above, wherein the compounds have different carbon lengths. The term "amino" refers to a —N(R)(R') moiety. In some cases, an alcohol can have more than two or more amino groups. As used herein, "diamine" and "polyamine" refer to amines having two or more amino groups.

As used herein, "isocyanate" or "isocyanates" refer to compounds having the general formula: R—NCO, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "isocyanate" or "isocyanates" may refer to a group of compounds with the general formula described above, wherein the compounds have different carbon lengths. The term "isocyanato" refers to a —NCO moiety. In some cases, an isocyanate can have more than two or more isocyanato groups. As used herein, "diisocyanate" and "polyisocyanate" refer to isocyanates having two or more isocyanato groups.

As used herein, "hydrocarbon" refers to an organic group composed of carbon and hydrogen, which can be saturated or unsaturated, and can include aromatic groups. The term "hydrocarbyl" refers to a monovalent or polyvalent (e.g., divalent or higher) hydrocarbon moiety. In some instances, a divalent hydrocarbyl group can be referred to as a "hydrocarbylene" group.

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 8 carbon atoms.

As used herein, "alpha-olefin" refers to an olefin (as defined above) that has a terminal carbon-carbon double bond. In some embodiments, the alpha-olefin is a terminal alkene, which is an alkene (as defined above) having a terminal carbon-carbon double bond. Additional carbon-carbon double bonds can be present.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group. Also, in some instances, one or more of the carbon atoms in the alkyl or alkylene group can be replaced by a heteroatom (e.g., selected from nitrogen, oxygen, or sulfur, including N-oxides, sulfur oxides, and sulfur dioxides, where feasible), and is referred to as a "heteroalkyl" or "heteroalkylene" group. In some instances, one or more of the carbon atoms in the alkyl or alkylene group can be replaced by an oxygen atom, and is referred to as an "oxyalkyl" or "oxyalkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number carbon atoms in an alkenyl group is represented by the phrase "$C_{x-y}$ alkenyl," which refers to an alkenyl group, as herein defined, containing from x to y, inclusive, carbon atoms. Thus, "$C_{2-6}$ alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group. Also, in some instances, one or more of the saturated carbon atoms in the alkenyl or alkenylene group can be replaced by a heteroatom (e.g., selected from nitrogen, oxygen, or sulfur, including N-oxides, sulfur oxides, and sulfur dioxides, where feasible), and is referred to as a "heteroalkenyl" or "heteroalkenylene" group. In some instances, one or more of the carbon atoms in the alkenyl or alkenylene group can be replaced by an oxygen atom, and is referred to as an "oxyalkenyl" or "oxyalkenylene" group.

As used herein, "cycloalkyl" refers to a 3- to 24-membered, cyclic hydrocarbon ring, which may be optionally substituted as herein further described, with multiple degrees of substitution being allowed. Such "cycloalkyl" groups are monocyclic or polycyclic. The term "cycloalkyl," as used herein, does not include ring systems that contain aromatic rings, but does include ring systems that can have one or more degrees of unsaturation. Examples of "cycloalkyl" groups, as used herein, include, but are not limited to, cyclopropyl, cyclobutyl, cyclopentyl, cyclohexyl, cycloheptyl, 1-norbornyl, 2-norbornyl, 7-norbornyl, 1-adamantyl, and 2-adamantyl. In some instances, the "cycloalkyl" group can be divalent, in which case the group can alternatively be referred to as a "cycloalkylene" group. Also, in some instances, one or more of the carbon atoms in the cycloalkyl or cycloalkylene group can be replaced by a heteroatom (e.g., selected from nitrogen, oxygen, or sulfur, including N-oxides, sulfur oxides, and sulfur dioxides, where feasible), and is referred to as a "heterocycloalkyl" or "heterocycloalkylene" group.

As used herein, "alkoxy" refers to —OR, where R is an alkyl group (as defined above). The number carbon atoms in an alkyl group is represented by the phrase "$C_{x-y}$ alkoxy," which refers to an alkoxy group having an alkyl group, as herein defined, containing from x to y, inclusive, carbon atoms.

As used herein, "halogen" or "halo" refers to fluorine, chlorine, bromine, and/or iodine. In some embodiments, the terms refer to fluorine and/or chlorine. As used herein, "haloalkyl" or "haloalkoxy" refer to alkyl or alkoxy groups, respectively, substituted by one or more halogen atoms. The terms "perfluoroalkyl" or "perfluoroalkoxy" refer to alkyl groups and alkoxy groups, respectively, where every available hydrogen is replaced by fluorine.

As used herein, "substituted" refers to substitution of one or more hydrogens of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Polyester Polyols

In at least one aspect, the disclosure provides polyester polyols that contain a long-chain aliphatic group as part of one or more of its repeating constitutional units. In some embodiments, the constitutional units containing the long-chain aliphatic group are derived from a dibasic acid, or an ester thereof. In some such embodiments, the polyester polyol contains other constitutional units, for example, constitutional units derived from one or more diols, which can react with the dibasic acids/esters to form a polyester.

In some embodiments, the polyester polyols include constitutional units derives from dibasic acids or esters thereof. In some such embodiments, the polyester polyols include, among other features, one or more constitutional units according to formula (I):

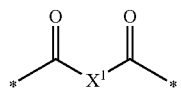

(I)

wherein $X^1$ is $C_{8-36}$ alkylene, $C_{8-36}$ alkenylene, $C_{8-36}$ heteroalkylene, or $C_{8-36}$ heteroalkenylene, each of which is optionally substituted one or more times by substituents selected independently from $R^1$; and $R^1$ is a halogen atom, —OH, —NH$_2$, $C_{1-6}$ alkyl, $C_{1-6}$ heteroalkyl, $C_{2-6}$ alkenyl, $C_{2-6}$ heteroalkenyl, $C_{3-10}$ cycloalkyl, or $C_{2-10}$ heterocycloalkyl.

In some embodiments, $X^1$ is $C_{10-36}$ alkylene, $C_{10-36}$ alkenylene, $C_{10-36}$ heteroalkylene, or $C_{10-36}$ heteroalkenylene, each of which is optionally substituted one or more times by substituents selected independently from $R^1$. In some embodiments, $X^1$ is $C_{12-36}$ alkylene, $C_{12-36}$ alkenylene, $C_{12-36}$ heteroalkylene, or $C_{12-36}$ heteroalkenylene, each of which is optionally substituted one or more times by substituents selected independently from $R^1$.

In some embodiments, $X^1$ is $C_{8-36}$alkylene, $C_{8-36}$alkenylene, or $C_{4-36}$ oxyalkylene, each of which is optionally substituted one or more times by substituents selected from the group consisting of a halogen atom, —OH, —O($C_{1-6}$ alkyl), —NH$_2$, —NH($C_{1-6}$ alkyl), and —N($C_{1-6}$ alkyl)$_2$. In some embodiments, $X^1$ is $C_{10-36}$ alkylene or $C_{10-36}$ alkenylene, each of which is optionally substituted one or more times by substituents selected from the group consisting of a halogen atom, —OH, —O($C_{1-6}$ alkyl), —NH$_2$, —NH($C_{1-6}$ alkyl), and —N($C_{1-6}$ alkyl)$_2$. In some embodiments, $X^1$ is $C_{12-36}$ alkylene or $C_{12-36}$ alkenylene, each of which is optionally substituted one or more times by substituents selected from the group consisting of a halogen atom, —OH, —O($C_{1-6}$ alkyl), —NH$_2$, —NH($C_{1-6}$ alkyl), and —N($C_{1-6}$ alkyl)$_2$.

In some embodiments, $X^1$ is $C_{8-36}$alkylene, $C_{8-36}$alkenylene, or $C_{4-36}$ oxyalkylene, each of which is optionally substituted one or more times by —OH. In some embodiments, $X^1$ is $C_{10-36}$ alkylene or $C_{10-36}$ alkenylene, each of which is optionally substituted one or more times by —OH. In some embodiments, $X^1$ is $C_{12-36}$ alkylene or $C_{12-36}$ alkenylene, each of which is optionally substituted one or more times by —OH. In some embodiments, $X^1$ is $C_{12-36}$ alkylene, which is optionally substituted one or more times by —OH In some embodiments, $X^1$ is —(CH$_2$)$_8$—, —(CH$_2$)$_9$—, —(CH$_2$)$_{10}$—, —(CH$_2$)$_{11}$—, —(CH$_2$)$_{12}$—, —(CH$_2$)$_{13}$—, —(CH$_2$)$_{14}$—, —(CH$_2$)$_{15}$—, —(CH$_2$)$_{16}$—, —(CH$_2$)$_{17}$—, —(CH$_2$)$_{18}$—, —(CH$_2$)$_{19}$—, —(CH$_2$)$_{20}$—, —(CH$_2$)$_{21}$—, or —(CH$_2$)$_{22}$—. In some embodiments, $X^1$ is —(CH$_2$)$_9$—, —(CH$_2$)$_{12}$—, or —(CH$_2$)$_{16}$—. In some embodiments, $X^1$ is —(CH$_2$)$_{16}$—.

The polyester polyols disclosed herein include additional constitutional units as well. In some embodiments, the additional constitutional units include constitutional units derived from diols. Thus, in some embodiments, the polyester polyol further includes one or more constitutional units according to formula (II):

(II)

wherein $X^2$ is $C_{2-18}$ hydrocarbylene, where one or more saturated carbon atoms of the hydrocarbylene group are optionally replaced by oxygen, nitrogen, sulfur, or silicon.

In some embodiments, $X^2$ is $C_{2-18}$ alkylene, $C_{2-18}$ alkenylene, $C_{2-18}$ heteroalkylene, or $C_{2-18}$ heteroalkenylene, each of which is optionally substituted one or more times by substituents selected independently from the group consisting of: a halogen atom, —OH, —NH$_2$, $C_{1-6}$ alkyl, $C_{1-6}$ heteroalkyl, $C_{2-6}$ alkenyl, $C_{2-6}$ heteroalkenyl, $C_{3-10}$ cycloalkyl, and $C_{2-10}$ heterocycloalkyl.

In some embodiments, $X^2$ is $C_{2-18}$alkylene, $C_{2-18}$alkenylene, or $C_{2-18}$ oxyalkylene, each of which is optionally substituted one or more times by substituents selected from the group consisting of a halogen atom, —OH, —O($C_{1-6}$ alkyl), —NH$_2$, —NH($C_{1-6}$ alkyl), and —N($C_{1-6}$ alkyl)$_2$. In some such embodiments, $X^2$ is $C_{2-18}$ alkylene or $C_{2-18}$ alkenylene, each of which is optionally substituted one or more times by substituents selected from the group consisting of a halogen atom, —OH, —O($C_{1-6}$ alkyl), —NH$_2$, —NH($C_{1-6}$ alkyl), and —N($C_{1-6}$ alkyl)$_2$. In some embodiments, $X^2$ is $C_{2-18}$alkylene, which is optionally substituted one or more times by substituents selected from the group consisting of a halogen atom, —OH, —O($C_{1-6}$ alkyl), —NH$_2$, —NH($C_{1-6}$ alkyl), and —N($C_{1-6}$ alkyl)$_2$.

In some embodiments, $X^2$ is $C_{2-18}$alkylene, $C_{2-18}$alkenylene, or $C_{2-18}$ oxyalkylene, each of which is optionally substituted one or more times by —OH. In some embodiments, $X^2$ is $C_{2-18}$alkylene or $C_{2-18}$alkenylene, each of which is optionally substituted one or more times by —OH. In some embodiments, $X^2$ is $C_{2-18}$ alkylene, which is optionally substituted one or more times by —OH.

In some embodiments, $X^2$ is —(CH$_2$)$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_{12}$—, —(CH$_2$)$_{13}$—, —(CH$_2$)$_{14}$—, —(CH$_2$)$_{15}$—, or —(CH$_2$)$_{16}$—. In some embodiments, $X^2$ is —(CH$_2$)$_4$—, —(CH$_2$)$_6$—, or —(CH$_2$)$_8$—.

In some embodiments, $X^2$ is a branched $C_{2-18}$alkylene, a branched $C_{2-18}$alkenylene, or a branched $C_{2-18}$ oxyalkylene, each of which is optionally substituted one or more times by —OH. In some embodiments, $X^2$ is a branched $C_{2-18}$ alkylene or a branched $C_{2-18}$alkenylene, each of which is optionally substituted one or more times by —OH. In some embodiments, $X^2$ is a branched $C_{2-18}$alkylene, which is optionally substituted one or more times by —OH.

In some embodiments, $X^2$ is —(CH$_2$)$_{0-3}$—CH(CH$_3$)—(CH$_2$)$_{0-3}$— or —(CH$_2$)$_{0-3}$—C(CH$_3$)$_2$—(CH$_2$)$_{0-3}$—. In some embodiments, $X^2$ is —(CH$_2$)$_{0-3}$—CH(CH$_3$)—(CH$_2$)$_{0-3}$—. In some embodiments, $X^2$ is —CH$_2$—CH(CH$_3$)— or —CH(CH$_3$)—CH$_2$—.

Other constitutional units can also be included. The polyester polyols disclosed herein, however, are predominantly made up of constitutional units joined by ester groups, e.g., ester groups formed from condensation reactions of diols with dibasic acids or esters thereof. In some embodiments, at least 70% of the constitutional units, or at least 80% of the constitutional units, or at least 85% of the constitutional units, or at least 90% of the constitutional units, or at least 95% of the constitutional units, or at least 97% of the constitutional units, in the polyester polyol are joined to one or more other constitutional units by an ester linkage, based on the total number of constitutional units in the polyester polyol.

In some embodiments, the polyester polyol includes at least two free hydroxyl groups, e.g., which are free to react with other groups (acids, isocyanates, and the like) to form graft copolymers or block copolymers. In some such embodiments, at least two of the two or more free hydroxyl groups are attached to a primary carbon, i.e., meaning that the hydroxyl is bonded to a carbon atom that is attached to only one other carbon atom, i.e., is part of a —$CH_2$—OH moiety.

The polyester polyols can be made in any suitable manner. In some embodiments, they can be formed from a reaction mixture that includes, among other things, diols, such as short-chain diols, and dibasic acids (or esters thereof). In some such embodiments, the polyol esters can be formed by condensation reactions.

Any suitable acid or ester can be used. In some embodiments, the acid or ester is 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecane-dioic acid, 1,18-octadecanedioic acid, 1,19-nonadecanedioic acid, 1,20-icosanedioic acid, 1,21-henicosanedioic acid, 1,22-docosanedioic acid, 1,23-tricosanedioic acid, 1,24-tetracosanedioic acid, or any esters thereof, or any mixtures of any of the foregoing. In some further embodiments, the acid or ester is 1,12-dodecanedioic acid, 1,13-tridecanedioic acid, 1,14-tetradecanedioic acid, 1,15-pentadecanedioic acid, 1,16-hexadecanedioic acid, 1,17-heptadecane-dioic acid, 1,18-octadecanedioic acid, 1,19-nonadecanedioic acid, 1,20-icosanedioic acid, 1,21-henicosanedioic acid, 1,22-docosanedioic acid, 1,23-tricosanedioic acid, 1,24-tetracosanedioic acid, or any esters thereof, or any mixtures of any of the foregoing. In some further embodiments, the acid or ester is 1,14-tetradecanedioic acid, 1,15-pentadecanedioic acid, 1,16-hexadecanedioic acid, 1,17-heptadecane-dioic acid, 1,18-octadecanedioic acid, 1,19-nonadecanedioic acid, 1,20-icosanedioic acid, 1,21-henicosanedioic acid, 1,22-docosanedioic acid, 1,23-tricosanedioic acid, 1,24-tetracosanedioic acid, or any esters thereof, or any mixtures of any of the foregoing. In some embodiments, the acid or ester is 1,11-undecanedioic acid, 1,14-tetradecanedioic acid, 1,18-octadecanedioic acid, or any esters thereof. In some embodiments, the acid or ester is 1,18-octadecanedioic acid, or any esters thereof.

The free acid or esterified forms of any of the above acids can be used. In some embodiments, the free acid is used. In some other embodiments, esterified forms (e.g., monobasic esters or dibasic esters) of the aforementioned acids are used. In some such embodiments, the dibasic esters of the aforementioned acids are used. Any suitable ester can be used. In some embodiments, the ester is an alkyl ester, such as a $C_{1-8}$ alkyl ester. In some such embodiments, the ester is a methyl ester, an ethyl ester, a propyl ester, an isopropyl ester, a butyl ester, an isobutyl ester, a sec-butyl ester, a tert-butyl ester, a pentyl ester, an isoamyl ester, a neopentyl ester, a hexyl ester, a 2-ethylhexyl ester, or any mixture thereof. In some embodiments, the ester is a methyl ester or an ethyl ester.

In some embodiments, the reaction mixture is substantially free of a monobasic acid or an ester thereof. As used herein, "monobasic acid" refers to a compound having a single acid group, and which has no functional groups that can be readily hydrolyzed to an acid group (e.g., simple carboxylate esters, carboxylate salts, anhydrides and the like). Non-limiting examples of monobasic acids include, but are not limited to, decanoic acid, dodecanoic acid, and the like. In some embodiments, the weight-to-weight ratio of dibasic acids (or esters thereof) to monobasic acids (or esters thereof) is at least 50:1, or at least 100:1, or at least 150:1, or at least 200:1, or at least 300:1, based on the total weight of the acid portions of the respective acids/esters.

In some embodiments, the acid or ester in the reaction mixture may include acids or esters predominantly of a single chain length. For example, in some embodiments, the acid or ester in the reaction mixture may be mostly 1,18-octadecanedioic acid or an ester thereof (e.g., an alkyl ester, such as a methyl, ethyl, or isopropyl ester). In some such embodiments, at least 80% by weight, or at least 85% by weight, or at least 90% by weight, or at least 95% by weight, or at least 97% by weight of the dibasic acid (or esters thereof) in the reaction mixture is 1,18-octadecanedioic acid or an ester thereof. In some such embodiments, the other dibasic acids (or esters thereof) in the reaction mixture primarily have carbon-chain lengths that are greater than that of 1,18-octadecanedioic acid, such as 1,20-icosanedioic acid. Thus, in some embodiments, the reaction mixture is substantially free of dibasic acids (or esters thereof) having carbon-chain lengths less than that of 1,18-octadecanedioic acid, such as 1,16-hexadecanedioic acid, and the like. In some such embodiments, the weight-to-weight ratio of 1,18-octadecanedioic acid (including esters thereof) to dibasic acids (including esters thereof) having carbon-chain lengths less than that of 1,18-octadecanedioic acid is at least 20:1, or at least 25:1, or at least 30:1, or at least 40:1, or at least 50:1, or at least 65:1, or at least 100:1, based on the total weight of the dibasic acid portions of the respective acids/esters.

As noted above, the reaction mixture can also include one or more diols, such as short-chain diols. As used herein, "short-chain diol" refers to a diol having from 1 to 18 carbon atoms. In some embodiments, the short-chain diol is a $C_{2-18}$ hydrocarbylene diol, where one or more saturated carbon atoms of the hydrocarbylene group are optionally replaced by oxygen, nitrogen, sulfur, or silicon. In some other embodiments, the short-chain diol is ethylene glycol, diethylene glycol, triethylene glycol, tetraethylene glycol, pentaethylene glycol, propylene glycol, dipropylene glycol, tripropylene glycol, tetrapropylene glycol, 1,3-propanediol, 1,3-butanediol, 1,4-butanediol, neopentyl glycol, 1,5-pentanediol, 1,6-hexanediol, 1,4-cyclohexane-dimethanol, hydroquinone bis(2-hydroxyethyl)ether, or p-di-(2-hydroxyethoxy)benzene, or any mixture thereof. In some other embodiments, the short-chain diol is 1,4-butanediol, 1,5-pentanediol, 1,6-hexanediol, 1,7-deptanediol, 1,8-octanediol, 1,9-nonanediol, 1,10-decanediol, 1,11-undecanediol, 1,12-dodecanediol, or any mixture thereof. In some further embodiments, the short-chain diol is 1,4-butanediol, 1,6-hexanediol, 1,8-octanediol, 1,10-decanediol, or any mixtures thereof. In some further embodiments, the short-chain diol is 1,4-butanediol. In some embodiments, the short-chain diol is 1,6-hexanediol.

In some embodiments, the polyester polyol can include a combination of two or more diols. For example, in some embodiments, the polyester polyol includes a mixture of two or more of 1,4-butanediol, 1,5-pentanediol, 1,6-hexanediol, 1,7-deptanediol, 1,8-octanediol, 1,9-nonanediol, 1,10-decanediol, 1,11-undecanediol, 1,12-dodecanediol, or any mixture thereof. In some further embodiments, the short-chain diol is 1,4-butanediol, 1,6-hexanediol, 1,8-octanediol, or 1,10-decanediol. For example, in some embodiments, the polyester polyol is formed from a mixture of 1,6-hexanediol with another diol, such as 1,4-hexanediol. In some embodiments, the polyester polyol is formed from a mixture of 1,6-hexanediol and 1,4-hexanediol, where the mole-to-mole ratio of 1,6-hexanediol to 1,4-butanediol ranges from 1:5 to 5:1, or from 1:3 to 3:1, or from 1:2 to 2:1, or from 1:1.5 to 1.5:1.

The reaction mixture can include any number of other species, as long as the species would not interfere substantially with the condensation reaction between the dibasic acids/esters and the diols. In some embodiments, the reaction mixture can include an amount of an acid and/or a base to adjust the pH of the reaction mixture. Further, in some embodiments, an amount of a heterogeneous or homogeneous catalyst can be present to facilitate the reaction. Suitable catalysts include, but are not limited to, organic acids or bases, organometallic compounds, enzymes, and the like.

Any suitable medium can be used in the reaction mixture. In some embodiments, the medium is an aqueous medium. In some embodiments, the aqueous medium includes, in addition to water, an amount of one or more other solvents that are substantially miscible with water, such as methanol, ethanol, acetone, and the like.

The polyester polyol can have any suitable molecular weight. In some embodiments, the molecular weight of the polyester polyol is 500 Da to 100,000 Da, or 500 Da to 50,000 Da, or 1,000 Da to 20,000 Da, or 1,000 Da to 10,000 Da, or 2,000 Da to 7,500 Da, or 3,000 Da to 5,000 Da. In some embodiments, the molecular weight of the polyester polyol is about 4,000 Da. In some embodiments, the molecular weight of the polyester polyol is 500 Da to 20,000 Da, or 500 Da to 10,000 Da, or 500 Da to 4,000 Da, or 500 Da to 3,000 Da. In some embodiments, the molecular weight of the polyester polyol is about 1,000 Da. In some embodiments, the molecular weight of the polyester polyol is about 2,000 Da.

In embodiments where a plurality of polyester polyols are formed, the resulting composition can be characterized in terms of an average molecular weight, such as a number average molecular weight ($M_n$), of the polyester polyols in the composition. In some embodiments, the number average molecular weight of the polyester polyol is 500 Da to 100,000 Da, or 500 Da to 50,000 Da, or 1,000 Da to 20,000 Da, or 1,000 Da to 10,000 Da, or 2,000 Da to 7,500 Da, or 3,000 Da to 5,000 Da. In some embodiments, the number average molecular weight of the polyester polyol is about 4,000 Da. In some embodiments, the number average molecular weight of the polyester polyol is 500 Da to 20,000 Da, or 500 Da to 10,000 Da, or 500 Da to 4,000 Da, or 500 Da to 3,000 Da. In some embodiments, the number average molecular weight of the polyester polyol is about 1,000 Da. In some embodiments, the number average molecular weight of the polyester polyol is about 2,000 Da.

In some embodiments, the polyester polyol can include certain units that can serve as potential sites for crosslinking. Such crosslinking sites can be incorporated into the polyester polyol by adding a small amount of a precursor to the reaction mixture, which reacts with one or both of the diols and/or acids/esters, and is thereby incorporated into the chain. Or, in some embodiments, crosslinking sites can be formed by introducing crosslinking agents, which can include substances having two or more functional groups that can react with existing functional groups in the polyester polyol chain.

In some instances, it may be useful to characterize the polyester polyols disclosed herein according to their melting point. In some embodiments, the polyester polyols have a melting point that is no more than 120° C., or no more than 110° C., or no more than 100° C., or no more than 90° C., or no more than 85° C., or no more than 80° C.

In some instances, it may be useful to characterize the polyester polyols disclosed herein according to their hydrolytic stability. As used herein, "hydrolytic stability" refers to the degree to which the polyester polyol breaks down over time during certain storage conditions. In general, the breakdown is measured by an "acid value," which is the weight of potassium hydroxide (in milligrams) needed to neutralize the acid generated from one (1) gram of the polyester polyol. The breakdown is measured over time, where the polyester polyol is stored at 120° C. (at about 1 atm pressure) in a composition that includes 3 pph (weight relative to polyester polyol) water. The acid value is measured at 7 days, 14 days, 21 days, and 28 days. The measurements are taken in a sealed container. In some embodiments, the polyester polyol shows no more than a 50% increase, or no more than a 40% increase, or no more than a 30% increase, or no more than a 20% increase, or no more than a 10% increase, in its acid value from the seventh (7th) day of storage to the twenty-first (21st) day of storage.

In some embodiments, at least a portion of the polyester polyol is derived from a renewable source, such as a natural oil or its derivatives. For example, in some embodiments, at least a portion of the short-chain diol can be derived from a renewable source. In some embodiments, at least a portion of the dibasic acid (or esters thereof) are derived from a renewable source. Methods of making dibasic acids and their esters are described, for example, in U.S. Patent Application Publication Nos. 2009/0264672 and 2013/0085288, both of which are hereby incorporated in their entirety as though fully set forth herein. Methods of making chemical compounds from renewable sources (e.g., using olefin metathesis) are described in further detail below.

Polymer Components Derived from Renewable Feedstocks

Due to the non-renewability of petroleum-based materials, it may be desirable to obtain some of the components of a polymer from certain renewable feedstocks. For example, in some embodiments, one or more components of a polymer can be obtained from certain renewable feedstocks, such as natural oils and their derivatives.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

Other techniques can also be used to convert renewable feedstocks to compounds useful as components for polymers. For example, one can use fermentation or use certain biological organisms to break down natural oils and release olefins and esters that can be used in polymeric materials or be modified to be used in polymeric materials.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple metathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments were a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

Olefin Metathesis of Renewable Feedstocks

As noted above, olefin metathesis can be used to make one or more of the monomers that may be used in the polymers disclosed herein. In some embodiments, one or more of these monomers are made by metathesizing a natural oil. Any suitable natural oil or natural oil derivative can be used. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene, among other products, is formed. Following transesterification, for example, with an alkyl alcohol, an amount of 9-denenoic acid methyl ester is formed. In some such embodiments, a separation step may occur between the metathesis and the transesterification, where the alkenes are separated from the esters. In some other embodiments, transesterification can occur before metathesis, and the metathesis is performed on the transesterified product.

Method of Forming a Dibasic Acid by Metathesis

In certain aspects, the disclosure provides methods of forming a dibasic acid, including: reacting a first olefin ester and an second olefin ester in the presence of a metathesis catalyst to form a first alkene and an unsaturated dibasic ester; hydrogenating the unsaturated dibasic ester to form a saturated dibasic ester; and converting the saturated dibasic ester to a saturated dibasic acid.

The methods include reacting the first olefin ester with the second olefin ester to form an unsaturated dibasic ester. Reactions of olefinic esters to make unsaturated dibasic esters are generally described in PCT Publication WO 2008/140468, and United States Patent Application Publication Nos. 2009/0264672 and 2013/0085288, all three of which are hereby incorporated by reference as though fully set forth herein in their entireties. If there is a direct or indirect contradiction between subject matter disclosed in the incorporated references and the present disclosure (e.g., definitions of the same term that differ in their scope), the description in the present disclosure controls.

As noted above, in some embodiments, one or more of the reactants for the metathesis reaction can be generated from a renewable source, e.g., by refining a natural oil or a derivative thereof. In some embodiments, the refining process includes cross-metathesizing the natural oil or a derivative thereof with an alkene. In such instances, the reactants may not be entirely pure, as certain other alkene and ester byproducts of the natural oil refining may be present in the input stream. Therefore, in some embodiments, the reactants can be subjected to a pre-treatment, such as a thermal pre-treatment, to remove certain impurities, including, but not limited to, water, volatile organics (esters and alkenes), and certain aldehydes.

Metathesis reactions can provide a useful synthetic tool for making new olefinic compounds from olefinic reactants. In general, metathesis involves an exchange of allylidene groups between two reacting olefin compounds. In some instances, the reacting compounds are the same, which can be referred to as a "self-metathesis" reaction. In other instances, however, the reacting compounds are different, which can be referred to as a "cross-metathesis reaction" reaction. Other types of metathesis reactions are also known.

Metathesis reactions can be carried out under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments were a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases or non-reactive gases include helium, neon, argon, nitrogen, methane (flared), and carbon dioxide, used individually or in with each other and other inert gases or non-reacting gases.

Metathesis reactions, including those disclosed herein, can be carried out in any suitable reactor, depending on a variety of factors. Relevant factors include, but are not limited to, the scale of the reaction, the selection of conditions (e.g., temperature, pressure, etc.) the identity of the reacting species, the identity of the resulting products and the desired product(s), and the identity of the catalyst. Suitable reactors can be designed by those of skill in the art, depending on the relevant factors, and incorporated into a reaction process such, such as those disclosed herein.

The metathesis reactions disclosed herein generally occur in the presence of one or more metathesis catalysts. Such methods can employ any suitable metathesis catalyst, such as any of those described in the previous sections.

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

In some embodiments, the first olefin ester and the second olefin ester are both terminal olefin esters, meaning that they have a terminal carbon-carbon double bond. In some such embodiments, the terminal olefin esters are independently compounds of formula (III):

or more times by —OH. In some further embodiments, $R^{11}$ is methyl, ethyl, propyl, isopropyl, butyl, isobutyl, sec-butyl, tert-butyl, pentyl, tert-pentyl, neopentyl, hexyl, or 2-ethylhexyl. In some even further embodiments, $R^{11}$ is methyl.

In some embodiments, the terminal olefin esters are different compounds. In some other embodiments, however, the terminal olefin esters are the same compound. In some embodiments, the terminal olefins esters are both esters of 9-decenoic acid, for example, in some further embodiments, both terminal olefin esters are 9-decenoic acid methyl ester.

When the terminal olefins esters react, an olefinic byproduct (e.g., an alkene) is also produced. In some embodiments, where the terminal olefin esters react to form an unsaturated dibasic ester, the resulting alkene is ethylene. The formed ethylene can be vented from the reactor during the course of the reaction, or can be allowed to stay in the reactor. Metathesis reactions that generate the desired unsaturated dibasic esters can be referred to as "productive metathesis," as the catalyst is used to make the desired product. In some instances, however, two terminal olefin esters can react in a way that simply regenerates two new molecules of the same terminal olefin esters that served as reactants. Such metathesis reactions can be referred to as "unproductive metathesis," as the catalyst is used to make products besides the desired unsaturated dibasic esters.

In some other embodiments, the first olefin ester and the second olefin ester are both internal olefin esters. In some such embodiments, the first olefin ester and the second olefin ester are independently compounds of formula (IV):

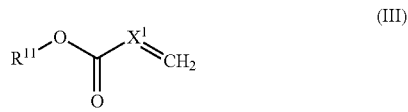

(III)

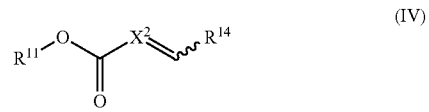

(IV)

wherein:

$X^1$ is $C_{3-18}$ alkylene, $C_{3-18}$ alkenylene, $C_{2-18}$ heteroalkylene, or $C_{2-18}$ heteroalkenylene, each of which is optionally substituted one or more times by substituents selected independently from $R^{12}$;

$R^{11}$ is $C_{1-12}$ alkyl, $C_{1-12}$ heteroalkyl, $C_{2-12}$ alkenyl, or $C_{2-12}$ heteroalkenyl, each of which is optionally substituted one or more times by substituents selected independently from $R^{12}$; and $R^{12}$ is a halogen atom, —OH, —NH$_2$, $C_{1-6}$ alkyl, $C_{1-6}$ heteroalkyl, $C_{2-6}$ alkenyl, $C_{2-6}$ heteroalkenyl, $C_{3-10}$ cycloalkyl, or $C_{2-10}$ heterocycloalkyl.

In some such embodiments, $X^1$ is $C_{3-18}$ alkylene, $C_{3-18}$ alkenylene, or $C_{2-18}$ oxyalkylene, each of which is optionally substituted one or more times by substituents selected from the group consisting of a halogen atom, —OH, —O(C$_{1-6}$ alkyl), —NH$_2$, —NH(C$_{1-6}$ alkyl), and N(C$_{1-6}$ alkyl)$_2$. In some further embodiments, $X^1$ is $C_{3-18}$ alkylene, $C_{3-18}$ alkenylene, or $C_{2-18}$ oxyalkylene, each of which is optionally substituted one or more times by —OH. In some even further embodiments, $X^1$ is —(CH$_2$)$_2$—CH=, —(CH$_2$)$_3$—CH=, —(CH$_2$)$_4$—CH=, —(CH$_2$)$_5$—CH=, —(CH$_2$)$_6$—CH=, —(CH$_2$)$_7$—CH=, —(CH$_2$)$_8$—CH=, —(CH$_2$)$_9$—CH=, —(CH$_2$)$_{10}$—CH=, —(CH$_2$)$_{11}$—CH=, —(CH$_2$)$_{12}$—CH=, —(CH$_2$)$_{13}$—CH=, —(CH$_2$)$_{14}$—CH=, or —(CH$_2$)$_{15}$—CH=. In some even further embodiments, $X^1$ is —(CH$_2$)$_7$—CH=.

In some such embodiments, $R^{11}$ is $C_{1-8}$ alkyl, $C_{2-8}$ alkenyl, or $C_{1-8}$ oxyalkyl, each of which is optionally substituted one wherein:

$X^2$ is $C_{3-18}$ alkylene, $C_{3-18}$ alkenylene, $C_{2-18}$ heteroalkylene, or $C_{2-18}$ heteroalkenylene, each of which is optionally substituted one or more times by substituents selected independently from $R^{15}$;

$R^{13}$ is $C_{1-12}$ alkyl, $C_{1-12}$ heteroalkyl, $C_{2-12}$ alkenyl, or $C_{2-12}$ heteroalkenyl, each of which is optionally substituted one or more times by substituents selected independently from $R^{15}$;

$R^{13}$ is $C_{1-12}$ alkyl, $C_{1-12}$ heteroalkyl, $C_{2-12}$ alkenyl, or $C_{2-12}$ heteroalkenyl, each of which is optionally substituted one or more times by substituents selected independently from $R^{15}$; and $R^{15}$ is a halogen atom, —OH, —NH$_2$, $C_{1-6}$ alkyl, $C_{1-6}$ heteroalkyl, $C_{2-6}$ alkenyl, $C_{2-6}$ heteroalkenyl, $C_{3-10}$ cycloalkyl, or $C_{2-10}$ heterocycloalkyl.

In some such embodiments, $X^2$ is $C_{3-18}$ alkylene, $C_{3-18}$ alkenylene, or $C_{2-18}$ oxyalkylene, each of which is optionally substituted one or more times by substituents selected from the group consisting of a halogen atom, —OH, —O(C$_{1-6}$ alkyl), —NH$_2$, —NH(C$_{1-6}$alkyl), and N(C$_{1-6}$ alkyl)$_2$. In some further such embodiments, $X^2$ is $C_{3-18}$alkylene, $C_{3-18}$alkenylene, or $C_{2-18}$ oxyalkylene, each of which is optionally substituted one or more times by —OH. In some even further such embodiments, $X^2$ is —(CH$_2$)$_2$—CH=, —(CH$_2$)$_3$—CH=, —(CH$_2$)$_4$—CH=, —(CH$_2$)$_5$—CH=, —(CH$_2$)$_6$—CH=, —(CH$_2$)$_7$—CH=, —(CH$_2$)$_8$—CH=, —(CH$_2$)$_9$—CH=, —(CH$_2$)$_{10}$—CH=, —(CH$_2$)$_{11}$—

$CH=$, $-(CH_2)_{12}-CH=$, $-(CH_2)_{13}-CH=$, $-(CH_2)_{14}-CH=$, or $-(CH_2)_{15}-CH=$. In some such embodiments, $X^2$ is $-(CH_2)_7-CH=$.

In some such embodiments, $R^{13}$ is $C_{1-8}$ alkyl, $C_{2-8}$ alkenyl, or $C_{1-8}$ oxyalkyl, each of which is optionally substituted one or more times by —OH. In some further such embodiments, $R^{13}$ is methyl, ethyl, propyl, isopropyl, butyl, isobutyl, sec-butyl, tert-butyl, pentyl, tert-pentyl, neopentyl, hexyl, or 2-ethylhexyl. In some even further such embodiments, $R^{13}$ is methyl.

In some such embodiments, $R^{14}$ is $C_{1-8}$ alkyl, $C_{2-8}$ alkenyl, or $C_{1-8}$ oxyalkyl, each of which is optionally substituted one or more times by —OH. In some further such embodiments, $R^{14}$ is methyl, ethyl, propyl, butyl, pentyl, hexyl, heptyl, octyl, or nonyl. In some even further such embodiments, $R^{14}$ is methyl or ethyl. In some embodiments, $R^{14}$ is ethyl.

In some embodiments, the internal olefin esters are different compounds. In some other embodiments, however, the internal olefin esters are the same compound. In some embodiments, the internal olefins esters are both esters of 9-dodecenoic acid, for example, in some further embodiments, both internal olefin esters are 9-dodecenoic acid methyl ester. In some other embodiments, the internal olefins esters are both esters of 9-undecenoic acid, for example, in some further embodiments, both internal olefin esters are 9-undecenoic acid methyl ester.

When the internal olefin esters react, an olefinic byproduct (e.g., an alkene) is also produced. In some embodiments, where the internal olefin esters react to form an unsaturated dibasic ester, the resulting alkene is an internal alkene. The identity of the formed internal alkenes will vary depending on the identity of the reacting internal olefin esters. In some embodiments, the resulting internal olefin ester is 2-butene, 2-pentene, 2-hexene, 3-hexene, 3-heptene, 4-octene, and the like. In some embodiments, the resulting internal olefin is 2-butene. In some other embodiments, the resulting internal olefin is 3-hexene. The formed internal alkene can be vented from the reactor during the course of the reaction, or can be allowed to stay in the reactor. As noted above, metathesis reactions that generate the desired unsaturated dibasic esters can be referred to as "productive metathesis," as the catalyst is used to make the desired product. In some instances, however, two internal olefin esters can react in a way that simply generates two new internal olefin esters. Such metathesis reactions can be referred to as "unproductive metathesis," as the catalyst is used to make products besides the desired unsaturated dibasic esters.

In some other embodiments, the first olefin ester is a terminal olefin ester and the second olefin is an internal olefin ester. In some such embodiments, the terminal olefin ester is a compound of formula (V), as disclosed above, including all further embodiments thereof. In some such embodiments, the internal olefin ester is a compound of formula (VI), as disclosed above, including all further embodiments thereof. In some such embodiments, the terminal olefin ester is an ester of 9-decenoid acid, such as 9-decenoic acid methyl ester. In some such embodiments, the internal olefin ester is an ester of 9-undecenoic acid or an ester of 9-dodecenoic acid, such as 9-undecenoic acid methyl ester or 9-dodecenoic acid methyl ester, respectively.

When the terminal olefin ester reacts with the internal olefin ester, an olefinic byproduct (e.g., an alkene) is also produced. In some embodiments, where the terminal olefin ester and the internal olefin ester react to form an unsaturated dibasic ester, the resulting alkene is a terminal alkene. The identity of the formed internal alkenes will vary depending on the identity of the reacting internal olefin ester. In some embodiments, the resulting terminal olefin ester is propene, 1-butene, 1-pentene, 1-hexene, and the like. In some embodiments, the resulting internal olefin is propene. In some other embodiments, the resulting internal olefin is 1-butene. The formed terminal alkene can be vented from the reactor during the course of the reaction, or can be allowed to stay in the reactor. As noted above, metathesis reactions that generate the desired unsaturated dibasic esters can be referred to as "productive metathesis," as the catalyst is used to make the desired product. In some instances, however, terminal and internal olefin esters can react in a way that simply generates a terminal olefin ester and an internal olefin ester. Such metathesis reactions can be referred to as "unproductive metathesis," as the catalyst is used to make products besides the desired unsaturated dibasic esters.

The embodiments above describe different ways in which metathesis reactions can be used to make an unsaturated dibasic ester. In some instances, however, two or more different productive metathesis reactions may be occurring at the same time. For example, in embodiments where the first olefin ester is a terminal olefin ester and the second olefin ester is an internal olefin ester, the terminal olefin ester and the internal olefin ester may each react with other molecules of the same compound, such that two self-metathesis reactions may compete with the cross-metathesis reaction. Also, in some embodiments, the terminal olefin ester can be generated from the internal olefin ester, e.g., by reacting the internal olefin ester with a terminal alkene in the presence of a metathesis catalyst. Or, in some alternative embodiments, the internal olefin ester can be generated from the terminal olefin ester, e.g., by reacting the terminal olefin ester with an internal alkene in the presence of a metathesis catalyst. In instances where the cross-metathesis reaction of the terminal olefin ester and the internal olefin ester can be kinetically favored, and where only a single olefin ester may be available, it can be advantageous to use such processes to generate different olefin esters, so as to allow for cross-metathesis to occur at the expense of self-metathesis.

The method includes hydrogenating the unsaturated dibasic ester to generate a saturated dibasic ester. The hydrogenation can be carried by any suitable means. In certain embodiments, hydrogen gas is reacted with the unsaturated dibasic ester in the presence of a hydrogenation catalyst to form a saturated dibasic acid, for example, in a hydrogenation reactor.

Any suitable hydrogenation catalyst can be used. In some embodiments, the hydrogenation catalyst comprises nickel, copper, palladium, platinum, molybdenum, iron, ruthenium, osmium, rhodium, or iridium, individually or in any combinations thereof. Such catalysts may be heterogeneous or homogeneous. In some embodiments, the catalysts are supported nickel or sponge nickel type catalysts. In some embodiments, the hydrogenation catalyst comprises nickel that has been chemically reduced with hydrogen to an active state (i.e., reduced nickel) provided on a support. The support may comprise porous silica (e.g., kieselguhr, infusorial, diatomaceous, or siliceous earth) or alumina. The catalysts are characterized by a high nickel surface area per gram of nickel. Commercial examples of supported nickel hydrogenation catalysts include those available under the trade designations NYSOFACT, NYSOSEL, and NI 5248 D (from BASF Catalysts LLC, Iselin, N.J.). Additional supported nickel hydrogenation catalysts include those commercially available under the trade designations PRICAT Ni 62/15 P, PRICAT Ni 55/5, PPRICAT 9910, PRICAT 9920, PRICAT 9908, PRICAT 9936 (from Johnson Matthey Catalysts, Ward Hill, Mass.).

The supported nickel catalysts may be of the type described in U.S. Pat. Nos. 3,351,566, 6,846,772, European Patent Publication No. 0168091, and European Patent Publication No. 0167201, each of which are incorporated by reference herein in their entireties. Hydrogenation may be carried out in a batch or in a continuous process and may be partial hydrogenation or complete hydrogenation. In certain embodiments, the temperature ranges from about 50° C. to about 350° C., about 100° C. to about 300° C., about 150° C. to about 250° C., or about 100° C. to about 150° C. The desired temperature may vary, for example, with hydrogen gas pressure. Typically, a higher gas pressure will require a lower temperature. Hydrogen gas is pumped into the reaction vessel to achieve a desired pressure of $H_2$ gas. In certain embodiments, the $H_2$ gas pressure ranges from about 15 psig (1 barg) to about 3000 psig (204.1 barg), about 15 psig (1 barg) to about 90 psig (6.1 barg), or about 100 psig (6.8 barg) to about 500 psig (34 barg). As the gas pressure increases, more specialized high-pressure processing equipment may be required. In certain embodiments, the reaction conditions are "mild," wherein the temperature is approximately between approximately 50° C. and approximately 100° C. and the $H_2$ gas pressure is less than approximately 100 psig. In other embodiments, the temperature is between about 100° C. and about 150° C., and the pressure is between about 100 psig (6.8 barg) and about 500 psig (34 barg). When the desired degree of hydrogenation is reached, the reaction mass is cooled to the desired filtration temperature.

The amount of hydrogenation catalyst is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 percent by weight or less, for example, about 5 percent by weight or less or about 1 percent by weight or less.

Following the metathesis (described above) the resulting composition can contain various impurities. These impurities can be compounds that were made by various kinds of unproductive metathesis. Or, in some instances, the impurities may result from the presence of impurities in the starting compositions. In any event, it can, in some embodiments, be desirable to strip out and/or distill out these impurities. In some such embodiments, the stripping and/or distilling can occur after the metathesis, but before the hydrogenation. In some alternative embodiments, the stripping and/or distilling can occur after both the metathesis and the hydrogenation. These impurities may contain more esters than hydrocarbons (e.g., monobasic esters), as certain alkene impurities can be vented out of the reactor during the metathesis reaction, e.g., due to the lower relative boiling point of the alkene impurities. Of course, in some instances, these alkene impurities may stay in the reactor long enough to involve themselves in certain metathesis reactions, thereby generating other impurities (e.g., an additional alkene impurity and an additional ester impurity). Paraffin impurities can also be present, which can be removed by the stripping and/or distilling, for example, after hydrogenation.

In some embodiments, the stripping may lead to the removal of certain amounts of the first olefin ester and/or the second olefin ester. In some such embodiments, these stripped out reactants can be collected and reused for further metathesis reactions.

In some embodiments, it may be desirable to further purify the saturated dibasic ester prior to the converting. For example, in some embodiments, the saturated dibasic ester can be recrystallized. The recrystallization can be carried out by any suitable technique. In general, the dissolved in a solvent system, for example, with heating, followed by cooling until solid crystals of the saturated dibasic ester appear. This can be a suitable means of removing impurities that are more soluble in the solvent system than the saturated dibasic ester, e.g., shorter-chain monobasic and dibasic esters and/or acids.

The method includes converting the saturated dibasic ester to a saturated dibasic acid. The concerting can be carried out by any suitable means. In some embodiments, the saturated dibasic ester is hydrolyzed according to any of the embodiments described above. In some other embodiments, the saturated dibasic ester is converted to a saturated dibasic acid by saponification, followed by acidification.

The resulting saturated dibasic acid can be a dibasic acid according to any of the above embodiments. In some embodiments, the dibasic acid is a compound having the formula: H—OOC—Y—COO—H, wherein Y denotes any organic compound (such as hydrocarbyl or silyl groups), including those bearing heteroatom containing substituent groups. In some such embodiments, Y is a divalent hydrocarbyl group, which can be optionally substituted with various heteroatom-containing substituents, or whose carbon atoms can be replaced by one or more heteroatoms. Such divalent hydrocarbyl groups can include substituted and unsubstituted alkylene, alkenylene, and oxyalkylene groups.

In some embodiments, the dibasic acid is a compound of formula (V):

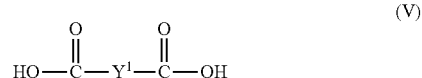

(V)

wherein, $Y^1$ is $C_{6-36}$ alkylene or $C_{6-36}$ heteroalkylene, each of which is optionally substituted one or more times by substituents selected independently from $R^3$; and $R^3$ is a halogen atom, —OH, —NH$_2$, $C_{1-6}$ alkyl, $C_{1-6}$ heteroalkyl, $C_{2-6}$ alkenyl, $C_{2-6}$ heteroalkenyl, $C_{3-10}$ cycloalkyl, or $C_{2-10}$ heterocycloalkyl.

In some embodiments, $Y^1$ is $C_{6-36}$ alkylene or $C_{4-36}$ oxyalkylene, each of which is optionally substituted one or more times by substituents selected from the group consisting of a halogen atom, —OH, —O($C_{1-6}$alkyl), —NH$_2$, —NH($C_{1-6}$ alkyl), and N($C_{1-6}$alkyl)$_2$. In some further such embodiments, $Y^1$ is $C_{6-36}$alkenylene, $C_{6-36}$alkenylene, or $C_{4-36}$ oxyalkylene, each of which is optionally substituted one or more times by —OH. In some further such embodiments, $Y^1$ is —(CH$_2$)$_8$—, —(CH$_2$)$_9$—, —(CH$_2$)$_{10}$—, —(CH$_2$)$_{11}$—, —(CH$_2$)$_{12}$—, —(CH$_2$)$_{13}$—, —(CH$_2$)$_{14}$—, —(CH$_2$)$_{15}$—, —(CH$_2$)$_{16}$—, —(CH$_2$)$_{17}$—, —(CH$_2$)$_{18}$—, —(CH$_2$)$_{19}$—, —(CH$_2$)$_{20}$—, —(CH$_2$)$_{21}$—, or —(CH$_2$)$_{22}$—. In some embodiments, $Y^1$ is —(CH$_2$)$_9$—. In some embodiments, $Y^1$ is —(CH$_2$)$_{12}$—. In some embodiments, $Y^1$ is —(CH$_2$)$_{16}$—.

In some embodiments, the saturated dibasic acid is undecanedioic acid. In some embodiments, the dibasic ester is tetradecanedioic acid. In some embodiments, the dibasic ester is octadecanedioic acid.

In some embodiments, the saturated dibasic acid can be further purified. In some embodiments, the purification is carried out using the recrystallization methods described above.

Any of the dibasic acids described above can be used to make the polyester polyols disclosed herein. In some embodiments, the conversion of the dibasic ester to the dibasic acid (e.g., by hydrolysis or by saponification followed by acidification) is not performed, thereby resulting in a purified dibasic ester, which can be used to make the polyester polyols disclosed herein. In some other embodiments, the pure dibasic acid can be reacted (e.g., with an alcohol) to generate a purified dibasic ester, which can be used to make the polyester polyols disclosed herein.

Compositions Including Polyester Polyols

The polyester polyols disclosed herein can be included in certain compositions. In some embodiments, the compositions are compositions that comprise a polyester polyol according to any of the embodiments disclosed herein and a carrier. In some embodiments, the composition is a dispersion. In some such embodiments, the carrier comprises water. In some embodiments, the composition further comprises an additional solvent, a co-solvent, a surfactant, a co-surfactant, an emulsifier, a natural or synthetic colorant, a natural or synthetic fragrance, an antioxidant, a corrosion inhibitor, or an antimicrobial agent.

Block Copolymers Including Polyester Polyols

The block copolymers disclosed herein have at least two different distinct blocks. One of these distinct blocks is formed by a polyester polyol, as described herein. The other block is formed from a diisocyanate prepolymer.

As used herein, "diisocyanate prepolymer" refers to a prepolymer, as herein defined, having at least two isocyanate groups. The two or more isocyanate groups can occur at any points on the prepolymer chain. Preferable, at least two of the two or more isocyanate groups are terminal isocyanate groups, meaning that they are part of a moiety having the following chemical structure: —$CH_2$—NCO. In some embodiments, the diisocyanate prepolymers can form a block in a block copolymer. In some such embodiments, two of the two or more isocyanate groups can each link to a polyester polyol, such as any of those disclosed herein, via a carbamate linkage. In some other embodiments, at least one of the two terminal isocyanate groups may link to a junction block (e.g., via a carbamate linkage), which, in turn, links to a polyester polyol.

The diisocyanate prepolymer can be formed in any suitable manner. In some embodiments, the diisocyanate prepolymer is formed from a reaction mixture that includes one or more short-chain diisocyanates and one or more short-chain diols.

Any suitable short-chain diisocyanate can be employed. In some embodiments, the short-chain diisocyanate is a $C_{2-18}$ hydrocarbylene diisocyanate, wherein one or more saturated carbon atoms of the hydrocarbylene group are optionally replaced by oxygen, nitrogen, sulfur, or silicon. In some embodiments, the short-chain diisocyanate is a toluene diisocyanate, a methylene diphenyl diisocyanate, a naphthalene diisocyanate, a $C_{1-16}$ alkylene diisocyanate, or any mixtures thereof. In some embodiments, the short-chain diisocyanate is 4,4'-diphenylmethane diisocyanate, 4,4'-methylene bis(cyclohexyl isocyanate), toluene 2,4-diisocyanate, toluene 2,6-diisocyanate, 1,5'-naphthalene diisocyanate, hexamethylene diisocyanate, isophorone diisocyanate, 1,3-xylene diisocyanate, 1,1,4,4-tetramethyl-p-xylylene diisocyanate, 1,1,4,4-tetramethyl-m-xylylene diisocyanate, 1,4-cyclohexane diisocyanate, 1,1'-methylene-bis-4(-isocyanato-cyclohexane), or a mixture thereof.

Any suitable short-chain diol can be used. In some embodiments, the short-chain diol is a $C_{2-18}$ hydrocarbylene diol, where one or more saturated carbon atoms of the hydrocarbylene group are optionally replaced by oxygen, nitrogen, sulfur, or silicon. In some embodiments, the short-chain diol is ethylene glycol, diethylene glycol, triethylene glycol, tetraethylene glycol, pentaethylene glycol, propylene glycol, dipropylene glycol, tripropylene glycol, tetrapropylene glycol, 1,3-propanediol, 1,3-butanediol, 1,4-butanediol, neopentyl glycol, 1,5-pentanediol, 1,6-hexanediol, 1,4-cyclohexane-dimethanol, hydroquinone bis(2-hydroxy-ethyl) ether, or p-di-(2-hydroxyethoxy)benzene, or any mixture thereof. In some embodiments, the short-chain diol is 1,4-butanediol, 1,5-pentanediol, 1,6-hexanediol, 1,7-deptanediol, 1,8-octanediol, 1,9-nonanediol, 1,10-decanediol, 1,11-undecanediol, 1,12-dodecanediol, or any mixture thereof. In some embodiments, the short-chain diol is 1,4-butanediol, 1,6-hexanediol, 1,8-octanediol, 1,10-decanediol, or any mixtures thereof. In some embodiments, the short-chain diol is 1,4-butanediol, 1,6-hexanediol, or a mixture thereof. In some embodiments, the short-chain diol is 1,4-butanediol. In some other embodiments, the short-chain diol is 1,6-hexanediol.

The reaction mixture can include any number of other species, as long as the species would not interfere substantially with the reaction between the diisocyanates and the diols. In some embodiments, the reaction mixture can include an amount of an acid and/or a base to adjust the pH of the reaction mixture. Further, in some embodiments, an amount of a heterogeneous or homogeneous catalyst can be present to facilitate the reaction. Suitable catalysts include, but are not limited to, organic acids or bases, organometallic compounds, enzymes, and the like.

Any suitable medium can be used in the reaction mixture. In some embodiments, the medium is an aqueous medium. In some embodiments, the aqueous medium includes, in addition to water, an amount of one or more other solvents that are substantially miscible with water, such as methanol, ethanol, acetone, and the like.

The diisocyanate prepolymer can have any suitable molecular weight. In some embodiments, the molecular weight of the diisocyanate prepolymer is 500 Da to 10,000 Da, or 500 Da to 5,000 Da, or 1,000 Da to 5,000 Da. In some embodiments, the molecular weight of the diisocyanate prepolymer is about 2,000 Da.

In embodiments where a plurality of diisocyanate prepolymers are formed, the resulting composition can be characterized in terms of an average molecular weight, such as a number average molecular weight ($M_n$), of the diisocyanate prepolymers in the composition. In some embodiments, the number average molecular weight of the diisocyanate prepolymers is 500 Da to 10,000 Da, or 500 Da to 5,000 Da, or 1,000 Da to 5,000 Da. In some embodiments, the number average molecular weight of the diisocyanate prepolymers is about 2,000 Da.

In some embodiments, such as those where the diisocyanate prepolymer is formed by reacting short-chain diisocyanates with short-chain diols, most of the linkages in the diisocyanate prepolymer are carbamate linkages. But, even in some such embodiments, other linkages can be present. For example, in some such embodiments, two isocyanate groups can react, thereby forming a urea linkage. In some other instances, a urea or carbamate group can further react to form further groups, including, but not limited to, an allophanate group, a biuret group, or a cyclic isocyanurate group. In some embodiments, at least 70%, or at least 80%, or at least 90%, or at least 95% of the linkages in the diisocyanate prepolymer are carbamate linkages.

In some embodiments, the diisocyanate prepolymer can include certain units that can serve as potential sites for crosslinking. Such crosslinking sites can be incorporated into the diisocyanate prepolymer by adding a small amount of a precursor to the reaction mixture, which reacts with one or both of the diols and/or diisocyanates and is thereby incorporated into the chain. Or, in some embodiments, crosslinking sites can be formed by introducing crosslinking agents, which can include substances having two or more functional groups that can react with urethane, urea, allophanate, and/or biuret groups in the diisocyanate prepolymer.

The block copolymers disclosed herein can be formed in any suitable manner. In some embodiments, the block copolymer is formed from a reaction mixture that includes one or more polyester polyols (according to any of the above embodiments) and one or more diisocyanate prepolymers (according to any of the above embodiments).

The reaction mixture can include any number of other species, as long as the species would not interfere substantially with the reaction between the diisocyanate prepolymers and the polyester polyols. In some embodiments, the reaction mixture can include an amount of an acid and/or a base to adjust the pH of the reaction mixture. Further, in some embodiments, an amount of a heterogeneous or homogeneous catalyst can be present to facilitate the reaction. Suitable catalysts include, but are not limited to, organic acids or bases, organometallic compounds, enzymes, and the like.

Any suitable medium can be used in the reaction mixture. In some embodiments, the medium is an aqueous medium. In some embodiments, the aqueous medium includes, in addition to water, an amount of one or more other solvents that are substantially miscible with water, such as methanol, ethanol, acetone, and the like.

The reaction mixture can include any suitable ratio of diisocyanate prepolymer to polyester polyol. In some embodiments, the mole-to-mole ratio of the polyester polyol to the diisocyanate prepolymer is 1:5 to 5:1, or 1:3 to 3:1, or 1:2 to 2:1, or 1:1.5 to 1.5:1, or 1:1.2 to 1.2:1. In some embodiments, the polyester polyol, once incorporated into a block copolymer, can be referred to as a "soft segment" of the block copolymer. Analogously, the diisocyanate prepolymer, once incorporated into a block copolymer, can be referred to as a "hard segment". In some embodiments, the resulting block copolymer is a thermoplastic polyurethane (TPU). In some such embodiments, the soft segment makes up from 30 to 90 percent by weight of the TPU, or 40 to 80 percent by weight of the TPU. The molecular weight (number average) of the soft segment can be from 500 to 20,000 Da, or from 1,000 to 10,000 Da, or from 1,000 to 5,000 Da, or from 1,000 to 4,000 Da. In some embodiments, the molecular weight (number average) of the soft segment is about 1000 Da, or about 2000 Da, or about 3000 Da, or about 4000 Da, or about 5,000 Da. In some embodiments, the hard segment makes up from 10 to 70 percent by weight of the TPU, or from 20 to 60 percent by weight of the TPU.

The block copolymer can have any suitable molecular weight. In some embodiments, the molecular weight of the block copolymer is 5,000 Da to 500,000 Da, or 5,000 Da to 200,000 Da, or 5,000 Da to 100,000 Da.

The resulting block copolymers can have any suitable properties. In some embodiments, the block copolymer exhibits a stress of at least 20 MPa, or at least 25 MPa at a strain of 600% at 25° C. In some embodiments, the block copolymer exhibits a stress of 20 to 35 MPa, or 25 to 35 MPa at a strain of 600% at 25° C. As used herein, stress and strain are measured on a 2-mm-thick polyurethane sheet, according to the American Society for the Testing of Materials (ASTM) Test No. D412.

The block copolymer can include additional blocks besides those formed from the polyester polyol and the diisocyanate prepolymer. In some embodiments, however, the block copolymer is a diblock copolymer having two distinct types of blocks: the blocks formed from the polyester polyol and the blocks formed from the diisocyanate prepolymer. For convenience, in any of the above embodiments, the block formed from the polyester polyol can be referred to as the "polyester block" and the block formed from the diisocyanate prepolymer can be referred to as the "polycarbamate block."

Because the polyester block and the polycarbamate block may have different polarities, they will tend to associate more readily with certain materials relative to others. In other words, one of the two blocks will generally be more compatible with certain materials that the other block. In some embodiments, the polyester blocks are selectively compatible with non-polar materials relative to the polycarbamate blocks. As used herein, "selectively compatible" refers to a thermodynamic preference for associating with or adhering to one material relative to one or more other materials. Such non-polar materials can include any organic or inorganic non-polar material, including, but not limited to, non-polar polymers, carbonaceous materials, and certain non-polar ceramics. In some embodiments, the non-polar material is a non-polar polymer. Examples of non-polar polymers include, but are not limited to, polyolefins, polystyrenes, fluoropolymers, and any copolymers thereof. In some embodiments, the non-polar polymer is: a polyethylene, such as a high-density polyethylene, a low-density polyethylene, a linear low-density polyethylene, and the like; a polypropylene; a polyisobutylene; a polystyrene, such as polystyrene, styrene-butadiene rubber, and the like; polystyrene block copolymers, such as acrylonitrile butadiene styrene (ABS), and the like; fluoropolymers, such as polyvinylfluoride, polyvinylidene fluoride, polytetrafluoroethylene, fluorinated ethylene-propylene, and the like; or any mixtures of the foregoing.

In some embodiments, the polycarbamate blocks are selectively compatible with polar materials relative to the polyester blocks. Such polar materials can include any organic or inorganic polar material, including, but not limited to, polar polymers, glasses, and polar ceramics. In some embodiments, the polar material is a polar polymer. Examples of polar polymers include, but are not limited to, acrylic polymers, polyamides, polycarbamates, polyureas, polyanhydrides, substituted polyvinyl polymers, polycarbonates, or any copolymers thereof. In some embodiments, the non-polar polymer is: an acrylic polymer, such as poly(acrylic acid), poly(methyl methacrylate), poly(acrylonitrile), and the like; a polyamide, such as polycaprolactam, nylon-6,6, aramids (e.g., para-aramids or meta-aramids), polyphthalamides, and the like; a polycarbamate; a polyurea; a polyanhydride; substituted polyvinyl polymers, such as polyvinyl alcohol, polyvinyl butyral, polyvinyl acetate, and the like; a polycarbonate, such as allyl diglycol carbonate, and the like; or any mixtures of the foregoing.

Polymer Compositions

In certain aspects, the block copolymers disclosed herein can be used in various polymer compositions. Such uses are not limited to any particular type of polymer composition, and can include solid compositions, liquid compositions (e.g., emulsions, suspensions, solutions, and the like), and compositions that have both liquid and solid phases. In some embodiments, the compositions are homogeneous, but, in other embodiments, the compositions are not homogeneous.

In some embodiments, the polymer composition includes, among other materials, a block copolymer as disclosed in any of the above embodiments, and another polymer (referred to in this section as "the first polymer"). Other polymers can be present, however. Thus, in some embodiments, the composition includes one or more additional polymers. In some other embodiments, however, the composition includes no additional polymers (except for polymeric materials that serve as fillers, etc.).

In some embodiments, the first polymer is a non-polar polymer. Examples of non-polar polymers include, but are not limited to, polyolefins, polystyrenes, fluoropolymers, and any copolymers thereof. In some embodiments, the non-polar polymer is: a polyethylene, such as a high-density polyethylene, a low-density polyethylene, a linear low-density polyethylene, and the like; a polypropylene; a polyisobutylene; a polystyrene, such as polystyrene, styrene-butadiene rubber, and the like; polystyrene block copolymers, such as acrylonitrile butadiene styrene (ABS), and the like; fluoropolymers, such as polyvinylfluoride, polyvinylidene fluoride, polytetrafluoroethylene, fluorinated ethylene-propylene, and the like; or any mixtures of the foregoing. In some embodiments, the first polymer is a polyethylene.

In some other embodiments, the first polymer is a polar polymer. Examples of polar polymers include, but are not limited to, acrylic polymers, polyamides, polycarbamates, polyureas, polyanhydrides, substituted polyvinyl polymers, polycarbonates, or any copolymers thereof. In some embodiments, the non-polar polymer is: an acrylic polymer, such as poly(acrylic acid), poly(methyl methacrylate), poly(acrylonitrile), and the like; a polyamide, such as polycaprolactam, nylon-6,6, aramids (e.g., para-aramids or meta-aramids), polyphthalamides, and the like; a polycarbamate; a polyurea; a polyanhydride; substituted polyvinyl polymers, such as polyvinyl alcohol, polyvinyl butyral, polyvinyl acetate, and the like; a polycarbonate, such as allyl diglycol carbonate, and the like; or any mixtures of the foregoing.

The first polymer may exhibit a preference for one of the blocks in the block copolymer over other blocks in the block copolymer. In some embodiments, the first polymer selectively interfaces with the polyester block of the copolymer relative to the polycarbamate block of the block copolymer. As used herein, "selectively interface(s)" refers to an observable thermodynamic preference for associating with or adhering to one material relative to one or more other materials. In some other embodiments, the first polymer selectively interfaces with the polycarbamate block of the copolymer relative to the polyester block of the block copolymer.

In some embodiments, the polymer composition can include another polymer, which can be referred to as "the second polymer." The second polymer can be any polar or non-polar polymer, as described above. In some embodiments, the second polymer selectively interfaces with the polyester block of the block copolymer. In some other embodiments, the second polymer selectively interfaces with the polycarbamate block of the block copolymer.

In some embodiments, the two polymers may compete to associate with various blocks of the block copolymer (e.g., in embodiments where both polymers may both be selectively compatible with the same blocks of the block copolymer, but not necessarily to the same degree). In some embodiments, the polyester block of the block copolymer selectively interfaces with the first polymer relative to the second polymer. In some such embodiments, the polycarbamate block of the block copolymer selectively interfaces with the second polymer relative to the first polymer. In some other embodiments, the polycarbamate block of the block copolymer selectively interfaces with the first polymer relative to the second polymer. In some such embodiments, the polyester block of the block copolymer selectively interfaces with the second polymer relative to the first polymer.

It should be noted that, in some instances, the first polymer and the second polymer may both be selectively compatible with the same block of the block copolymer relative to other blocks of the block copolymer. The more compatible block of the block copolymer may, however, be more selectively compatible with one of the two polymers relative to the other. Thus, in such a situation, the less compatible of the two polymers may be forced to interface with the less desirable of the two blocks in the copolymer, as that provides the thermodynamically most stable arrangement. This may, at least in some instances, occur when both the first and second polymers have somewhat similar polarity. For example, in some embodiments, the first polymer can be a polyethylene, and the second polymer can be a polypropylene, which are both non-polar polymers, even though the polyethylene may be generally less polar than the polypropylene. In such a situation, both the polyethylene and polypropylene may prefer to interface with the polyester block of the block copolymer rather than with the polycarbamate block of the block copolymer. In some such embodiments, the polyethylene will end up interfacing with the polyester blocks and the polypropylene will end up interfacing with the polycarbamate blocks, as this may present the thermodynamically most stable arrangement.

In some embodiments, the polymer composition is a polymer blend or a polymer alloy. Such blends or alloys can be solids, liquids, of semi-solids. In some embodiments, the block copolymer is distributed throughout the blend or alloy in a substantially uniform manner. In some other embodiments, the block copolymer is distributed throughout the blend or alloy in a non-uniform manner. In general, the incorporation of the block copolymer into the blend or alloy permits modification of certain properties of the first polymer, such as improving its compatibility with other materials, such as paints and coatings. Addition of the block copolymer may also improve the degree to which the first polymer may blend with other materials, such as fillers or other polymeric materials.

In some embodiments, the polymer blend or alloy is formed into an article having a solid or semi-solid surface, where the surface is paintable. In some such embodiments, the presence of the block copolymer in the blend or alloy improves the paintability of the surface (e.g., enhances the adhesion between the painted coating and the surface). Thus, in certain aspects, the disclosure provides a method for improving the paintability of a polymer, which includes incorporating an amount of the block copolymer into the polymer to form a polymer blend or alloy that includes the block copolymer.

In some embodiments, the polymer blend or alloy includes a polyethylene and a block copolymer according to any of the above embodiments. In some such embodiments, the presence of the block copolymer in the polymer blend or alloy improves the degree to which the polyethylene adheres to certain more polar materials (e.g., a paint or coating).

In some embodiments, the polymer blend or alloy includes the second polymer (as described above). The second polymer can be present in the blend or alloy in any suitable amount. For example, in some embodiments, the mass-to-mass ratio of the first polymer to the second polymer in the blend or alloy is 1:100 to 100:1, or 1:50 to 50:1, or 1:20 to 20:1, or 1:10 or 10:1, or 1:5 to 5:1, or 1:3 to 3:1, or 1:2 to 2:1. In some embodiments, the first polymer and the second polymer are at least partially miscible with each other at room temperature and atmospheric pressure. In some other embodiments, however, the first polymer and the second polymer are not substantially miscible at room temperature and atmospheric pressure. In some embodiments where the first polymer and the second polymer are not substantially miscible, the block copolymer can serve as compatibilizing agent, thereby reducing the degree of phase segregation within the blend or alloy. In such embodiments, the polyester block of the block copolymer may interface with one of the two polymers, while the polycarbamate block may interface with the other of the two polymers. This, in certain aspects, the disclosure provides a method for reducing the phase segregation within a blend or alloy of two substantially immiscible polymers, which includes adding an amount of the block copolymer to the blend or alloy.

In the blends or alloys described above, the block copolymer can be present in any suitable amount. In some embodiments, the mass-to-mass ratio of the first polymer to the block copolymer is at least 5:1, or at least 7:1, or at least 10:1, or at least 15:1, or at least 20:1, or at least 25:1, or at least 35:1, or at least 50:1, or at least 75:1, or at least 100:1, or at least 200:1, or at least 300:1, e.g., up to a 100,000:1 ratio. In embodiments where the second polymer is present in the blend or alloy, the mass-to-mass ratio of the second polymer to the block copolymer is at least 5:1, or at least 7:1, or at least 10:1, or at least 15:1, or at least 20:1, or at least 25:1, or at least 35:1, or at least 50:1, or at least 75:1, or at least 100:1, or at least 200:1, or at least 300:1, e.g., up to a 100,000:1 ratio.

Such blends or alloys can be made by any suitable means known in the art for making polymer blends or alloys using polyurethane block copolymers. The blends or alloys can also include various fillers or other materials. Any suitable filler material can be used, according to the knowledge of those skilled in the art. For example, in some embodiments, the filler can be metal, glass, ceramic, or any mixture thereof. In some embodiments, the filler material can be coated with a size to enhance its compatibility with the polymeric matrix. In some embodiments, the sizing composition can include an amount of the block copolymer according to any of the embodiments described above.

In some other embodiments, the polymer composition is a multi-layered structure, e.g., a structure having two or more layers. Thus, in some embodiments, the polymer composition includes a first layer including the first polymer, and a second layer disposed on the first layer including the block copolymer. In some such embodiments, the block copolymer layer serves to improve the interfacial compatibility of the first layer with other materials. Thus, in some embodiments, the polymer composition also includes a third layer disposed on the second layer. The third layer can be any suitable material, including, but not limited to, metal, glass, ceramic, or any mixture or combination thereof. In some embodiments, the third layer includes the second polymer.

The above-mentioned layers can be disposed on each other in any suitable manner, according to the knowledge of those skilled in the art. The technique employed may depend on a variety of factors, including, but not limited to, the identity of the materials in the layers, the layer thickness, and the desired use of the composition. In some embodiments, any two or more of the layers are laminated to each other. In some other embodiments, any two or more of the layers are welded to each other. In some other embodiments, any of the layers can be coated or painted onto another layer.

Any of the layers described above can include additional materials, including, but not limited to, fillers. Any suitable filler material can be used, according to the knowledge of those skilled in the art. For example, in some embodiments, the filler can be metal, glass, ceramic, or any mixture thereof. In some embodiments, the filler material can be coated with a size to enhance its compatibility with the polymeric matrix. In some embodiments, the sizing composition can include an amount of the block copolymer according to any of the embodiments described above.

In any of the above embodiments, the polymer composition can be processed in various ways or incorporated into various compositions. For example, in some embodiments, the polymer composition is an extruded article or is part of an extruded article. In some other embodiments, the polymer composition is an injection-molded article or is part of an injection-molded article. In some other embodiments, the polymer composition is a solution or is part of a solution. In some other embodiments, the polymer composition is an emulsion or is part of an emulsion.

In any of the above embodiments, the block copolymer in the polymer composition is present in a continuous phase. In other embodiments, the block copolymer is present in a discrete phase. In some embodiments, the first and/or second polymer described above is/are present in a continuous phase. In other embodiments, the first and/or second polymer is/are present in a discrete phase. For example, in some embodiments, the polymer composition includes a block copolymer present in a discrete phase and a first and/or second polymer present in a continuous phase. In other embodiments, the polymer composition includes a block copolymer present in a continuous phase and a first and/or second polymer present in a discrete phase.

FIG. 1 depicts a polymer composition that includes a blend or alloy of two polymers, where one of the polymers is a block copolymer according to certain embodiments disclosed herein. The composition 100 includes a first polymer 102, which can be a polar or non-polar polymer, depending on the embodiment. The composition 100 further includes a block copolymer 101 of any of the above embodiments, for example, a block copolymer having polyester blocks and polycarbamate blocks. In some embodiments, the first polymer 102 is a polyethylene.

Figure 2:
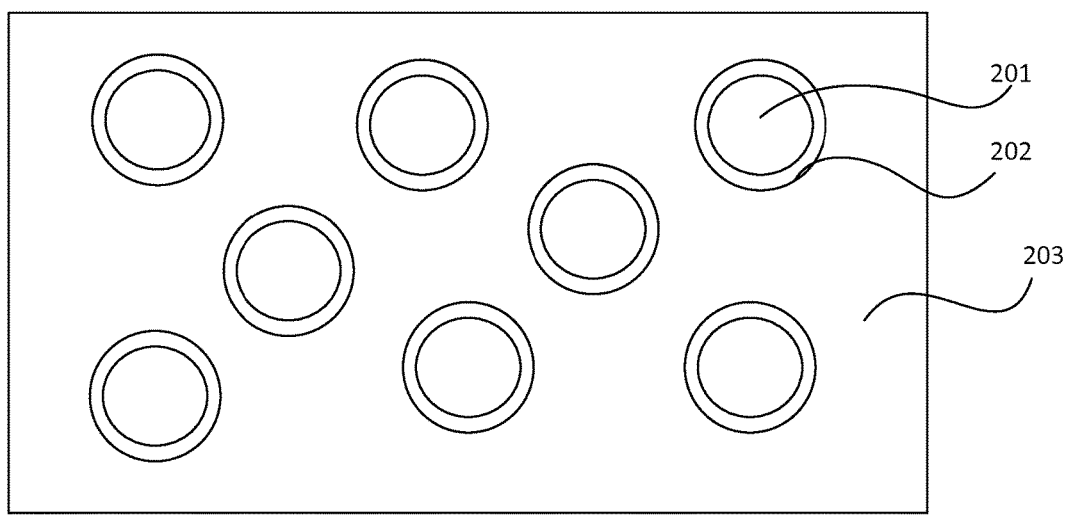
FIG. 2 depicts a polymer composition that includes a blend or alloy of three polymers, where one of the polymers is a block copolymer according to certain embodiments disclosed herein.

FIG. 2 depicts a polymer composition that includes a blend or alloy of three polymers, where one of the polymers is a block copolymer according to certain embodiments disclosed herein. The composition 200 includes: a first polymer 201, which can be a polar or non-polar polymer, depending on the embodiment; and a second polymer 203, which can be a polar or non-polar polymer, depending on the embodiment. The composition 200 further includes a block copolymer 202 of any of the above embodiments, for example, a block copolymer having polyester blocks and polycarbamate blocks, where the block copolymer functions as a compatibilizing agent between the first polymer and the second polymer. In some embodiments, the second polymer 203 is a polyethylene, and the first polymer 201 is a more polar polymer, such as a polypropylene, an acrylic polymer, a polyamide, and the like.

Figure 3:
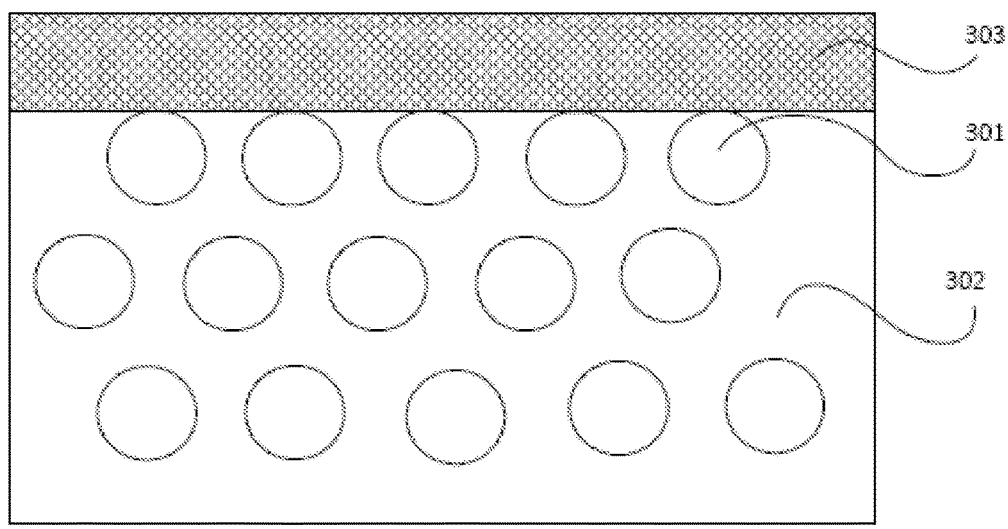
FIG. 3 depicts a polymer composition that includes a blend or alloy of two polymers, where one of the polymers is a block copolymer according to certain embodiments disclosed herein, wherein a coated or painted layer is disposed on at least one surface of the polymer composition.

FIG. 3 depicts a polymer composition that includes a blend or alloy of two polymers, where one of the polymers is a block copolymer according to certain embodiments disclosed herein, wherein a coated or painted layer is disposed on at least one surface of the polymer composition. The composition includes a first polymer 302, which can be a polar or non-polar polymer, depending on the embodiment. The composition further includes a block copolymer 301 of any of the above embodiments, for example, a block copolymer having polyester blocks and polycarbamate blocks. Further, a coated or painted layer 303 is disposed on at least one surface of the polymer composition. In some embodiments, the first polymer 302 is a polyethylene.

Figure 4:
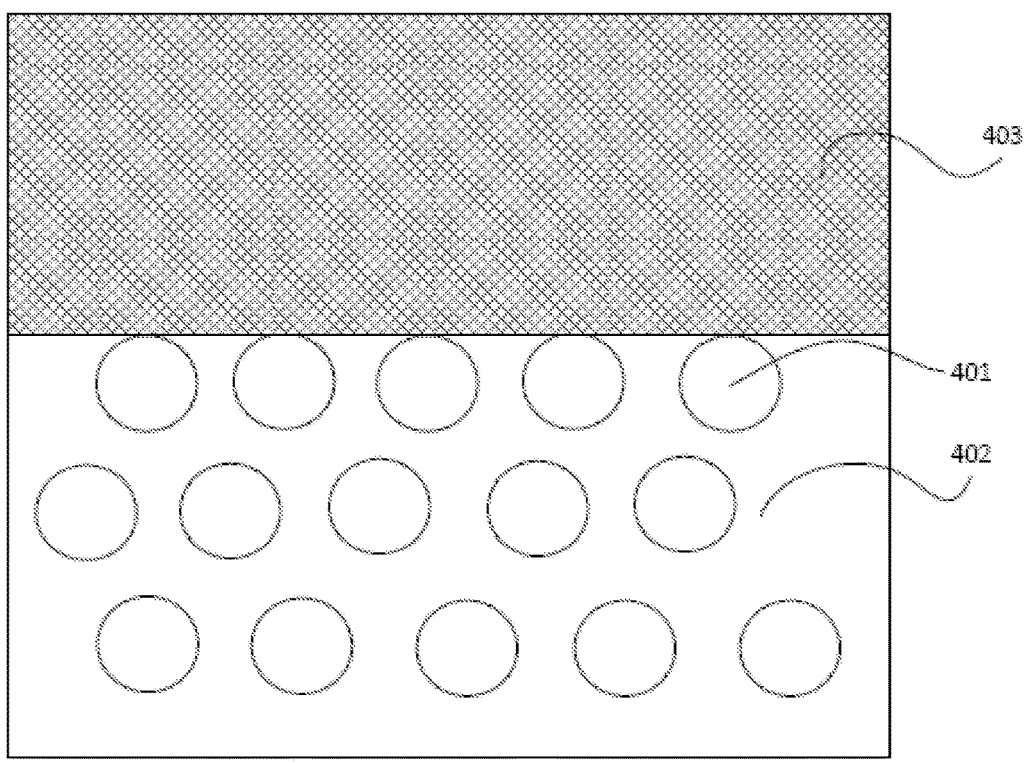
FIG. 4 depicts a polymer composition that includes a blend or alloy of two polymers, where one of the polymers is a block copolymer according to certain embodiments disclosed herein, wherein a further layer is disposed on at least one surface of the polymer composition (e.g., by welding, laminating, etc.).

FIG. 4 depicts a polymer composition that includes a blend or alloy of two polymers, where one of the polymers is a block copolymer according to certain embodiments disclosed herein, wherein a further layer is disposed on at least one surface of the polymer composition (e.g., by welding, laminating, etc.). The composition includes a first polymer 402, which can be a polar or non-polar polymer, depending on the embodiment. The composition further includes a block copolymer 401 of any of the above embodiments, for example, a block copolymer having polyester blocks and polycarbamate blocks. Further, an additional layer 403 is disposed on at least one surface of the polymer composition. In some embodiments, the first polymer 402 is a polyethylene.

Figure 5:
FIG. 5 depicts a polymer composition that includes a polymer layer, wherein a further layer, which includes a block copolymer according to certain embodiments disclosed herein, is disposed on the polymer layer.

FIG. 5 depicts a polymer composition that includes a polymer layer, wherein a further layer, which includes a block copolymer according to certain embodiments disclosed herein, is disposed on the polymer layer. The composition 500 includes a first polymer layer 501, which can be a polar or non-polar polymer, depending on the embodiment. The composition 500 further includes a layer that includes a block copolymer 502 of any of the above embodiments, for example, a block copolymer having polyester blocks and polycarbamate blocks. In some embodiments, the first polymer layer 501 is a polyethylene layer.

Figure 6:
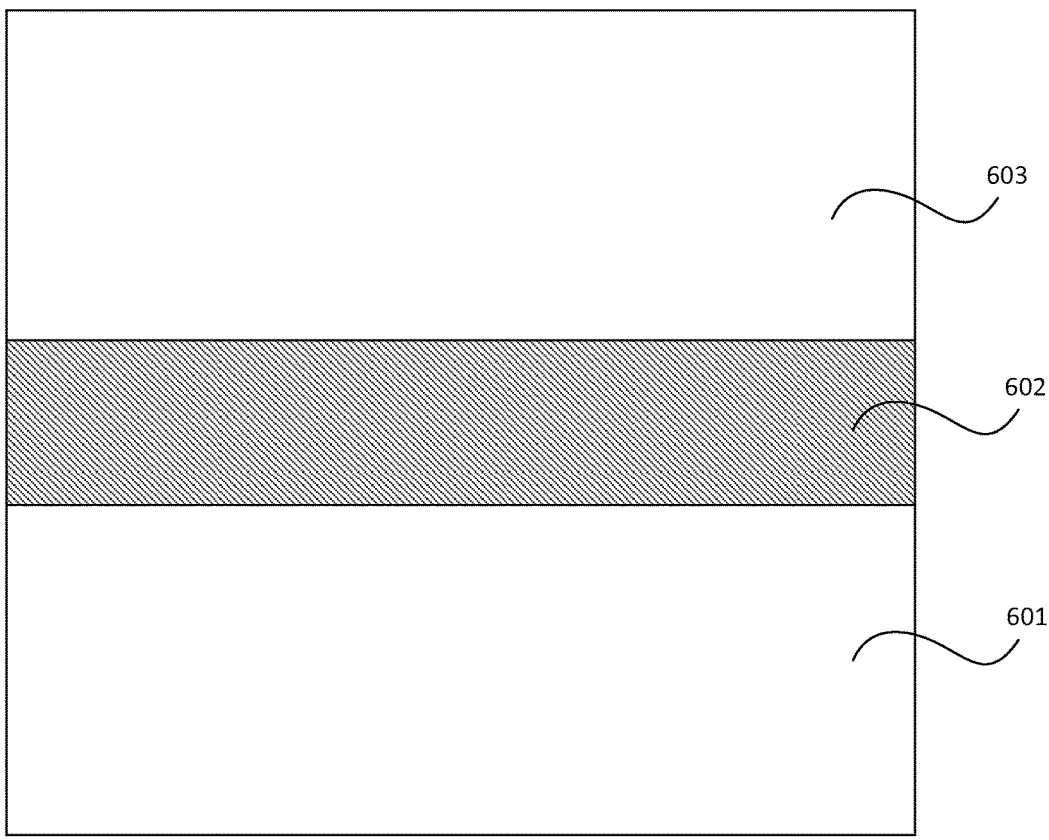
FIG. 6 depicts a polymer composition that includes two polymer layers, wherein a further layer, which includes a block copolymer according to certain embodiments disclosed herein, is disposed between the two polymer layers.

FIG. 6 depicts a polymer composition that includes two polymer layers, wherein a further layer, which includes a block copolymer according to certain embodiments disclosed herein, is disposed between the two polymer layers. The composition 600 includes: a first polymer layer 601, which can be a polar or non-polar polymer, depending on the embodiment; and a second polymer layer 603, which can be a polar or non-polar polymer, depending on the embodiment. The composition 600 further includes a layer that includes a block copolymer 602 of any of the above embodiments, for example, a block copolymer having polyester blocks and polycarbamate blocks. In some embodiments, the first polymer layer 601 is a polyethylene layer. In some embodiments, the second polymer layer 603 is a layer that includes a more polar polymer, such as a polypropylene, an acrylic polymer, a polyamide, and the like.

Compositions Including Polyurethane Block Copolymers

The polyurethane block copolymers disclosed herein can be included in certain compositions. In some embodiments, the compositions are compositions that comprise a polyurethane block copolymer according to any of the embodiments disclosed herein and a carrier. In some embodiments, the composition is a dispersion. In some such embodiments, the carrier comprises water. In some embodiments, the composition further comprises an additional solvent, a co-solvent, a surfactant, a co-surfactant, an emulsifier, a natural or synthetic colorant, a natural or synthetic fragrance, an antioxidant, a corrosion inhibitor, or an antimicrobial agent.

Thermoplastic Polyurethanes and Uses Thereof

The polyurethane block copolymers disclosed herein can be used in a wide variety of applications, such as those typical for thermoplastic polyurethanes (TPUs). For example, in some embodiments, the polyurethane block copolymers disclosed herein can be used in various automotive applications, such as to make housings, hoses, undercarriages or components thereof, skins, coatings, gaskets, and the like. In some embodiments, the polyurethane block copolymers disclosed herein can be used in medical devices, such as in tubing or in implantable devices (e.g., as coatings). In some embodiments, the polyurethane block copolymers disclosed herein can be used in various oilfield applications, such as in the tubings, casings, and the like that are used in oil and gas drilling. In some embodiments, the polyurethane block copolymers disclosed herein can be used in various aeronautical applications, such as in aircraft coatings. In some embodiments, the polyurethane block copolymers disclosed herein can be used in a wide array of various other coating applications, such as architectural coatings, industrial coatings, bridge coatings, and the like.

Shape-Memory Polymers

In some embodiments, the TPUs disclosed herein are suitable for use as shape-memory polymers. As used herein, the term "shape-memory polymers" refers to polymers that retain one permanent shape and one or more temporary shapes. In some such embodiments, the polymers retain one permanent shape and one temporary shape. In some such embodiments, the transition from the temporary shape to the permanent shape is induced by a temperature change. In some such embodiments, the polymers have multiple glass transition temperatures, e.g., $T^1$, $T^2$, and $T^3$, where $T^1<T^2<T^3$. In such embodiments, the polymer can be molded into a permanent shape at a temperature above $T^3$. The polymer can then be molded into a temporary shape at a temperature between $T^2$ and $T^3$, which can be locked in by cooling the polymer to a temperature below $T^2$. The temporary shape is retained at temperatures below $T^2$. But when the polymer is heated to a temperature above $T^2$, the polymer reverts to the permanent shape that was previously locked in at a temperature above $T^3$.

Polymers having shape-memory properties can be characterized by the extension and recovery (ER) of a 40 mm×1 mm×1 mm strand, which is the degree to which the temporary shape can be extended beyond the 40 mm length. In some embodiments, the TPU has an ER of at least 300%, or at least 400%, or at least 500%, or at least 600%.

TPUs having such shape-memory properties can be used in a wide array of applications, including, but not limited to, sensors (e.g., automotive sensors), gaskets, switches, biomedical implants, etc.

EXAMPLES

Example 1

Synthesis of Polyester Polyols

Polyester polyols were prepared by conventional condensation polymerization of a dibasic acid (octadecanedioic acid ("ODDA") or adipic acid) with a diol (1,4-butane diol ("BD") or 1,6-hexane diol ("HD")). Table 1 describes six different polyester polyols that were prepared.

TABLE 1

|  | Dibasic Acid | Diol | Target MW* | Viscosity** |
|---|---|---|---|---|
| Sample 1A | ODDA | BD | 2000 Da | 1550 cSt |
| Sample 1B | ODDA | BD | 1000 Da | 90 cSt |
| Sample 1C | ODDA | HD | 2000 Da | 850 cSt |
| Sample 1D | Adipic Acid | BD | 2000 Da | 510 cSt |
| Sample 1E | Adipic Acid | BD | 1000 Da | 60 cSt |
| Sample 1F | Adipic Acid | HD | 2000 Da | 430 cSt |

*Target number-average molecular weight (actual within +/− 10%)
**Measured at 90° C. using ASTM Test No. D4878

The polyester polyols were used to make polyurethane block copolymers, as described in the following Examples.

Example 2

Synthesis of Polyurethane Block Copolymers

The polyester polyols from Example 1 were demoisturized for 24 hours under vacuum (1-3 mm Hg) with continuous mixing by a magnetic stirrer. In each case, the temperature of the polyester polyol was maintained at a temperature above its melting temperature (e.g., about 10° C. above), so that the polymer remained in the liquid phase throughout the demoisturizing.

The polyurethane block copolymers were prepared by a conventional one-shot method using 1,4-butane diol ("BD") as the chain extender and 4,4'-diphenylmethane diisocyanate ("MDI") as the diisocyanate. Six different block copolymers were prepared by reacting BD, MDI, and the respective Samples from Example 1 using conventional techniques. For example, to prepare Sample 2A. the polyol of Sample 1A was conditioned to 100° C. and then 57.6 g placed into a Teflon speed mixer cup, also preheated to 100° C., suited for the FlackTek Speed Mixer. Then, 2.42 g of demoisturized 1,4-butanediol (BD), which was conditioned at 100° C. was added to the polyol. These two components were mixed for twenty seconds at 2200 rpm and then placed in the oven at 100° C. Then, 13.5 g of 4,4'-diphenylmethane diisocyanate (MDI, Mondur M) was weighed into syringe and placed in the oven at 90° C. When the components were conditioned at respective temperatures, MDI was added to the polyol-chain extender mixture and immediately mixed for twenty seconds. At about fifty five seconds from the time when isocyanate was added to the mixture of polyol and chain extender, the resin was poured into an Al mold lined with Teflon that was preheated to 120° C. and pressed immediately in the Carver Press which was preheated to 120° C. The TPU sheet was allowed to cure at 120° C. for two hours and then was transferred to a 100° C. oven. After removal, seven days were allowed to pass before any testing was conducted. Other samples in Example 2 were prepared in an analogous manner.

Sheets and round-bottom samples of the resulting polyurethane block copolymers ("TPUs") were prepared for testing. Table 2 describes certain details related to the synthesis of the synthesized TPUs. Sample 2A used the polyester polyol corresponding to Sample 1A, Sample 2B used the polyester polyol ("PP") corresponding to Sample 1B, and so on.

TABLE 2

|  | PP Amt. (pbw) | MDI Amt. (pbw) | Diol Amt. (pbw) | Isocyanate Index |
|---|---|---|---|---|
| Sample 2A | 57.6 | 13.5 | 2.42 | 102 |
| Sample 2B | 55.1 | 27.1 | 4.83 | 102 |
| Sample 2C | 57.3 | 15.1 | 2.69 | 102 |
| Sample 2D | 57.4 | 14.5 | 2.58 | 102 |
| Sample 2E | 54.9 | 28.4 | 5.05 | 102 |
| Sample 2F | 57.4 | 14.5 | 2.58 | 102 |

Example 3

Physical Properties

Certain physical properties of the synthesized TPUs were also tested. Table 3 describes certain physical and/or chemical properties of the synthesized TPUs.

TABLE 3

|  | Shore A Hardness[1] | Shore D Hardness[2] | Tensile Strength[3] | Elongation[4] |
|---|---|---|---|---|
| Sample 2A | 92 | 54 | 4933 | 724 |
| Sample 2B | 99 | 59 | 4866 | 599 |
| Sample 2C | 97 | 55 | 2235 | 453 |
| Sample 2D | 74 | 27 | 4163 | 766 |
| Sample 2E | 87 | 38 | 5625 | 529 |
| Sample 2F | 89 | 43 | 2279 | 819 |

[1]Shore A hardness, at room temperature (r.t.) after 7 days, according to ASTM Test No. D2240
[2]Shore D hardness, at r.t. after 7 days, according to ASTM Test No. D2240
[3]Tensile strength at break, at r.t., according to ASTM Test No. D412
[4]Elongation (%) at break, at r.t., according to ASTM Test No. D412

Figure 7:
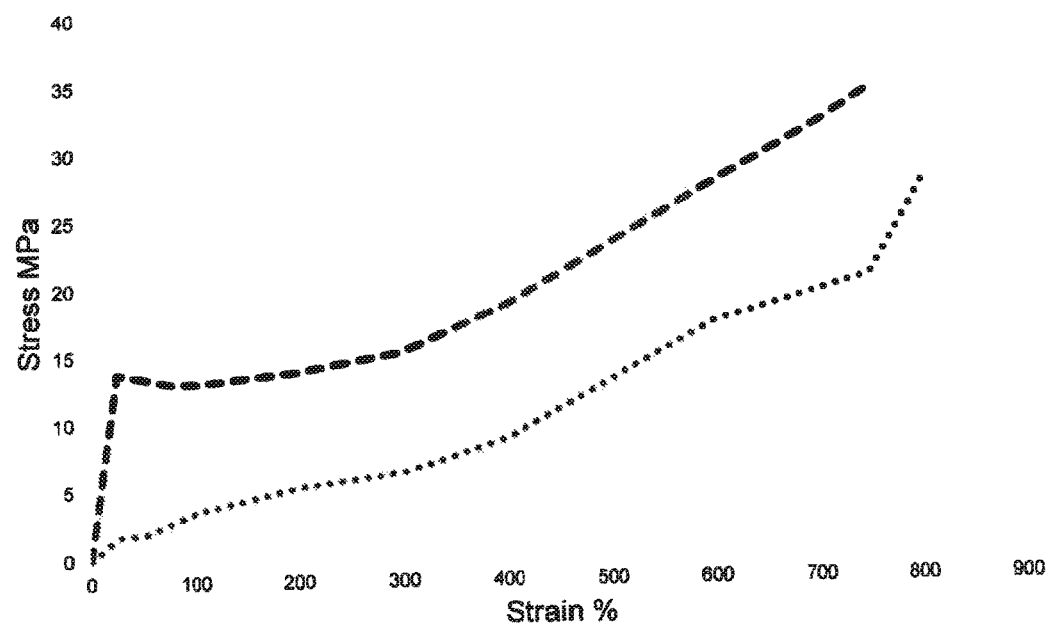
FIG. 7 depicts the stress (in MPa) plotted against the strain (in % increase of original length) for polyurethane block copolymers made using polyester polyols using adipic acid and octadecanedioic acid. Stress and strain were measured on a 2-mm-thick polyurethane sheet, according to the American Society for the Testing of Materials (ASTM) Test No. D412.

The stress as a function of strain was also measured for Sample 2A and Example 2D. As used herein, stress and strain are measured on a 2-mm-thick polyurethane sheet, according to the American Society for the Testing of Materials (ASTM) Test No. D412. The results from the stress-strain measurements are shown in FIG. 7. Sample 2A is identified as "BD-C18 2000" and Sample 2D is identified as "BD-Adipate 2000".

Table 4 describes the solvent resistance of the synthesized TPUs. Solvent resistance was measured as the percent weight loss in a TPU sample after 7 days.

TABLE 4

|  | Sample 2A | Sample 2C | Sample 2D | Sample 2F |
|---|---|---|---|---|
| Water | 0.64 | 0.53 | 1.26 | 1.17 |
| MEK[1] | 13.0 | 11.4 | 400 | disintegrated |
| Toluene | 20.2 | 17.1 | 79.2 | 116 |
| 0.1N HCl | 0.70 | 0.41 | 1.27 | 1.30 |
| 0.1N NaOH | 0.57 | 0.60 | 1.05 | 1.02 |
| Pump Oil | 1.58 | 0.58 | 0.75 | 1.58 |

[1]MEK = methyl ethyl ketone

Example 4

Shame Memory Effect

The TPU of Sample 2C was determined to have three glass transition temperatures, i.e., at −80° C., 20° C., and 150° C. The glass transition temperatures were determined by a dynamic mechanical thermogram. A TPU sample of Sample 2C was molded into a flat bar at a temperature above 150° C. The sample was cooled to about room temperature, and then heated to 70° C., where it was molded into a corkscrew shape. The sample was cooled to below 20° C., where it maintained the corkscrew shape. The sample was then reheated to 70° C., whereupon it returned to the original flat bar shape.

Example 5

Shame Memory Effect and Branched Diol Polyester Polyols

A polyester polyol from 169.81 grams of 1,18-octadecanedioic acid and 47.94 grams propylene glycol was synthesized via melt polymerization at 180° C. After recovery, 60 grams of the polyester polyol was melted at 100° C. and 2 equivalents of H12MDI (Methylene bis (4-cyclohexylisocyanate)) was added to the polyol to form an isocyanate terminated prepolymer. The reaction was continued for 2 hours. The prepolymer (50.0 grams) was then mixed with 1.5 grams of 1,4-butane diol and after 60 seconds of mixing poured into a 8"×8" mold that was preheated at 150° C. in a heated press. The press was closed and the polymer was cured for 2 hours under pressure followed by 12 hours in a 150-° C. oven.

The sample was characterized via DSC and DMA. The sample was found to have a soft segment $T_g$ of −60° C., a soft segment melting temperature of 51° C., and a hard segment melting of 157° C. This is consistent with material properties of phase separated polyurethanes with a semi-crystalline soft segment.

After curing, small samples were cut from the molded part. A sample 40 mm in length×1 mm width×2 mm thickness was heated on a hot plate to ~100° C. The sample was then pulled to a length of 220 mm and allowed to cool. After cooling to room temperature, the sample retained its length of 220 mm. The sample was then heated again to ~100° C. The sample returned to its original length of 40 mm×1 mm×1 mm within 60 seconds. This represents an extension and recovery of 550%. The same sample was heated again on a hot plate to ~100° C. The sample was then pulled to a length of 258 mm and allowed to cool. After cooling to room temperature, the sample retained its length of 258 mm. The sample was then heated again to ~100° C. The sample returned to its original length of 40 mm×1 mm×1 mm within 60 seconds. This represents an extension and recovery of 645%.

The foregoing detailed description and accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

What is claimed is:

1. A polymer composition comprising:
   a first polymer; and
   a second polymer, wherein the second polymer is a block copolymer, wherein the block copolymer comprises: (a) a first block, which is formed from a reaction mixture comprising a short-chain diisocyanate and a first short-chain diol, wherein at least 70% of the linkages between monomers in the first block are urethane linkages; and (b) a second block, which comprises a polyester polyol formed from a second short-chain diol and octadecanedioic acid or an ester thereof.

2. The polymer composition of claim 1, wherein the first polymer is a non-polar polymer.

3. The polymer composition of claim 2, wherein the first polymer is a polyolefin, a polystyrene, or a copolymer thereof.

4. The polymer composition of claim 3, wherein the first polymer is: a polyethylene; a polypropylene; a polyisobutylene; a polystyrene; a polystyrene copolymer; or any mixtures thereof.

5. The polymer composition of claim 1, wherein the first polymer is a polar polymer.

6. The polymer composition of claim 5, wherein the first polymer is: an acrylic polymer, a polyamide, a polycarbamate, a polyurea, a polyvinyl alcohol, a polyvinyl butyral, or any copolymers thereof, or any mixtures of any of the foregoing.

7. The polymer composition of claim 6, wherein the first polymer is a poly(acrylic acid), poly(methyl methacrylate), a poly(acrylonitrile), a polyamide, or a polycarbamate.

8. The polymer composition of claim 1, further comprising an additional polymeric material.

9. The polymeric composition of claim 1, further comprising metal, glass, ceramic, or any mixture or combination thereof.

10. The polymer composition of claim 1, wherein the composition is a polymer blend.

11. The polymer composition of claim 10, wherein the polymer blend is formed into an article having at least one solid surface, wherein the at least one solid surface is a paintable surface.

12. The polymer composition of claim 1, wherein the composition is a polymer alloy.

13. The polymer composition of claim 12, wherein the polymer alloy is formed into an article having at least one solid surface, wherein the at least one solid surface is a paintable surface.

14. The polymer composition of claim 1, wherein the composition comprises:
   a first layer comprising the first polymer; and
   a second layer, disposed on the first layer, comprising the block copolymer.

15. The polymer composition of claim 14, wherein the first layer and the second layer are laminated to each other.

16. The polymer composition of claim 14, wherein the first layer and the second layer are welded to each other.

17. The polymer composition of claim 14, wherein the second layer is coated onto the first layer.

18. The polymer composition of claim 14, further comprising a third layer, which comprises a metal, a glass, a ceramic, or a mixture or combination thereof, wherein the third layer is disposed on the first layer or the second layer.

19. The polymer composition of claim 1, wherein the polymer composition is an extruded article, and wherein the first polymer and the block copolymer are co-extruded.

20. The polymer composition of claim 1, wherein the composition is an injection molded article.

* * * * *